United States Patent
Ibars Casas et al.

(10) Patent No.: US 11,528,719 B2
(45) Date of Patent: Dec. 13, 2022

(54) LATENCY REDUCTION TECHNIQUES FOR RADIO ACCESS NETWORKS

(71) Applicant: APPLE INC., Cupertino, CA (US)

(72) Inventors: Christian Ibars Casas, Santa Clara, CA (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 15/571,500

(22) PCT Filed: Dec. 22, 2015

(86) PCT No.: PCT/US2015/067331
§ 371 (c)(1),
(2) Date: Nov. 2, 2017

(87) PCT Pub. No.: WO2016/195754
PCT Pub. Date: Dec. 8, 2016

(65) Prior Publication Data
US 2018/0310324 A1    Oct. 25, 2018

Related U.S. Application Data

(60) Provisional application No. 62/169,276, filed on Jun. 1, 2015.

(51) Int. Cl.
*H04W 72/12* (2009.01)
*H04L 1/00* (2006.01)
(Continued)

(52) U.S. Cl.
CPC ........... *H04W 72/12* (2013.01); *H04L 1/0007* (2013.01); *H04L 1/0018* (2013.01);
(Continued)

(58) Field of Classification Search
None
See application file for complete search history.

(56) References Cited

U.S. PATENT DOCUMENTS

2007/0060167 A1\* 3/2007 Damnjanovic ....... H04W 52/02
455/450
2010/0238910 A1\* 9/2010 Conway ................ H04L 1/1664
370/336
(Continued)

FOREIGN PATENT DOCUMENTS

CN    103428775 A    12/2013
CN    104254995 A    12/2014
(Continued)

OTHER PUBLICATIONS

International Search Report, dated Apr. 11, 2016, Application No. PCT/US2015/067331, Filed Date: Dec. 22, 2015, pp. 5.
(Continued)

*Primary Examiner* — Faruk Hamza
*Assistant Examiner* — Cassandra L Decker
(74) *Attorney, Agent, or Firm* — Eschweiler & Potashnik, LLC

(57) ABSTRACT

Latency reduction techniques for radio access networks are described. In various embodiments, a reduced transmission time interval (rTTI) may be implemented in order to reduce air interface latency in a radio access network. In some embodiments, an rTTI block may be defined, and some operations may be performed in rTTI block-wise fashion in order to reduce the marginal overhead associated with implementation of the rTTI. In various embodiments in which an rTTI is implemented, DM-RS granularity may be improved by use of techniques that enable data and reference signals to be multiplexed within a same OFDM symbol. In some embodiments, a current transmission time interval (TTI) may be maintained, and latency reduction
(Continued)

may be achieved via the use of novel techniques for one or more of code block (CB) segmentation, uplink (UL) resource element (RE) mapping and HARQ cycle timing. Other embodiments are described and claimed.

20 Claims, 23 Drawing Sheets

(51) Int. Cl.
*H04L 1/18* (2006.01)
*H04W 72/04* (2009.01)
*H04W 84/04* (2009.01)

(52) U.S. Cl.
CPC .......... *H04L 1/1812* (2013.01); *H04L 1/1861* (2013.01); *H04L 1/1893* (2013.01); *H04W 72/042* (2013.01); *H04W 72/121* (2013.01); *H04W 84/042* (2013.01)

(56) References Cited

U.S. PATENT DOCUMENTS

| | | | |
|---|---|---|---|
| 2010/0303045 A1* | 12/2010 | Venkob | H04W 72/0413 370/336 |
| 2011/0158205 A1* | 6/2011 | Niemasz, Jr. | H04W 52/42 370/336 |
| 2012/0014369 A1* | 1/2012 | Venkob | H04W 72/042 370/347 |
| 2013/0034054 A1* | 2/2013 | Wu | H04L 27/2602 370/328 |
| 2015/0029996 A1 | 1/2015 | Yuan | |
| 2016/0100395 A1* | 4/2016 | Xu | H04L 1/1607 370/336 |
| 2016/0323070 A1* | 11/2016 | Chen | H04L 1/1861 |
| 2016/0337087 A1* | 11/2016 | Chen | H04L 1/1822 |
| 2017/0288819 A1* | 10/2017 | Chen | H04W 72/0446 |
| 2017/0290008 A1* | 10/2017 | Tooher | H04L 1/1893 |
| 2017/0318564 A1* | 11/2017 | Lee | H04L 1/00 |
| 2018/0042013 A1* | 2/2018 | Byun | H04L 27/2602 |
| 2018/0049165 A1* | 2/2018 | Byun | H04W 72/042 |
| 2018/0098337 A1* | 4/2018 | Lee | H04W 72/1278 |
| 2018/0110062 A1* | 4/2018 | Byun | H04W 72/1273 |

FOREIGN PATENT DOCUMENTS

| | | | | |
|---|---|---|---|---|
| CN | 104620648 | A | 5/2015 | |
| CN | 104662818 | A | 5/2015 | |
| CN | 104662984 | A | 5/2015 | |
| EP | 1835670 | A1 * | 9/2007 | .......... H04L 1/0003 |
| JP | 2008053864 | A | 3/2008 | |
| WO | 2010/148972 | A | 12/2010 | |
| WO | 2014/098701 | A1 | 6/2014 | |
| WO | 2016/040290 | A1 | 9/2015 | |

OTHER PUBLICATIONS

Samsung: "Discussion on ePDCCH Design Issues", 3GPP Draft; R1-112517 EPDCCH, 3rd Generation Partnership Project (3GPP), TSG-RAN1#66 Meeting, Mobile Competence Centre, vol. RAN WG1, Athens, Greece; Aug. 22-26, 2011, XP050537597, pp. 4, retrieved from http://www.3gpp.org/DynaReport/TDocExMtg-R1-66-28505.htm.

HTC: "E-PDCCH Design Considerations on Multiplexing with PDSCH", 3GPP Draft; R1-120266, 3rd Generation Partnership Project (3GPP), 3GPP TSG-RAN WG1 #68, Mobile Competence Centre, vol. RAN WG1, Dresden, Germany, Feb. 6, 2012-Feb. 10, 2012, Feb. 1, 2012, ZP050563176, pp. 4, retrieved from http://www.3gpp.org/DynaReport/TDocExMtg-R1-68-29000.htm.

Interdigital Communications, LLC, "Improving LTE UL Coverage for VoIP", 3GPP Draft; R1-120145, 3rd Generation Partnership Project (3GPP), 3GPP TSG-RAN WG1 Meeting #68, Mobile Competence Centre, vol. RAN WG1, Dresden, Germany, Feb. 6-10, 2012, XP050562715, pp. 5, retrieved from http://www.3gpp.org/DynaReport/TDocExMtg-R1-68-29000.htm.

Huawei: "Further details on SR sharing", 3GPP Draft, R2-101052, Further Details on SR Sharing, 3rd Generation Partnership Project (3GPP), 3GPP TSG RAN WG2 Meeting #69, Mobile Competence Centre, vol. Ran WG2, San Francisco, US, Feb. 22-26, 2010, XP050604991, retrieved from http://www.3gpp.org/DynaReport/TDocExMtg-R2-69-28030.htm.

Ericsson, et al., "Evaluation on UL DMRS Overhead Reduction", 3GPP Draft; R1-131615—7.2.5.2.1—Evaluation on UL DMRS Overhead Reduction, 3rd Generation Partnership Project (3GPP), 3GPP TSG-RAN WG1 #72bis, Mobile Competence Centre, vol. RAN WG1, Chicago, USA, Apr. 15-19, 2013, XP050697393, retrieved from http://www.3gpp.org/DynaReport/TDocExMtg-R1-72b-30042.htm.

International Report on Patentability dated Dec. 5, 2017 for International Application No. PCT/US2015/067331.

European Extended Search Report dated Oct. 11, 2022 in connection with Application Serial No. 22180034.5.

\* cited by examiner

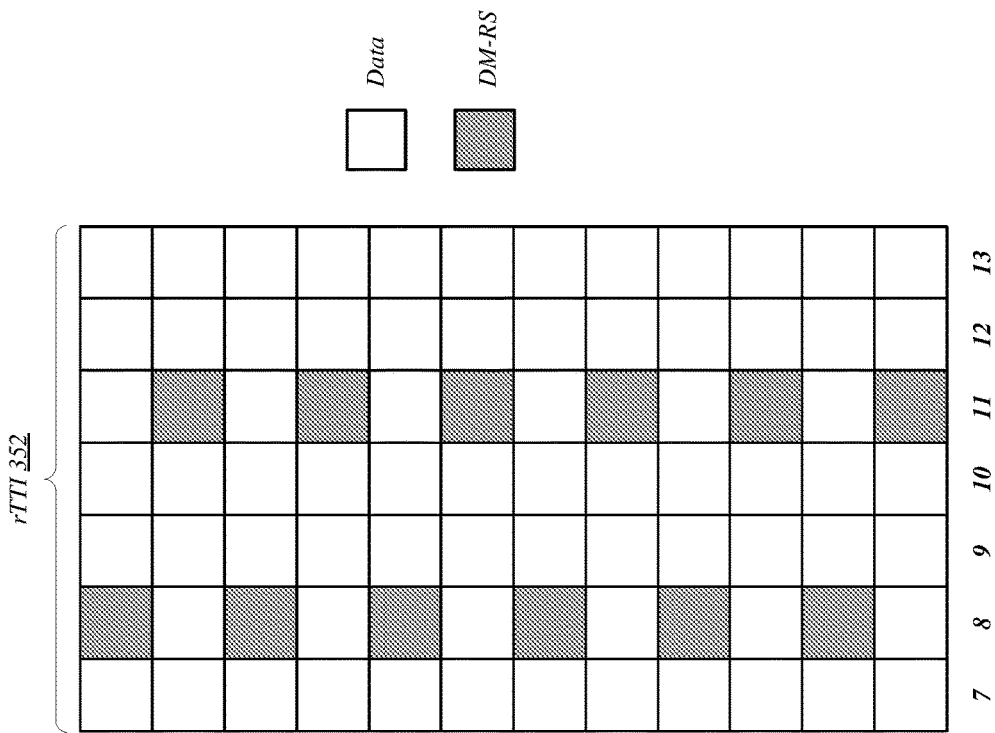
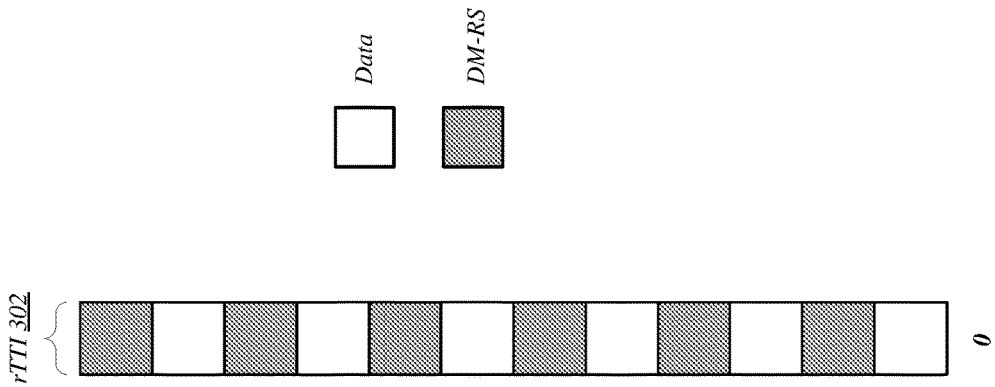
FIG. 3

| rTTI length (symbols) | Example Patterns |
|---|---|
| 1 | B |
| 2 | AB (in next TTI alternate to Acs(B,1*n); Bcs(B,1*n); |
| 3 | ABA, Acs(B,1*n)A; in the next TTI; Bcs(B,1*n)cs(B,2*n) |
| 4 | ABAcs(B,1*n); ABAA; AABA; Bcs(B,1*n)cs(B,2*n)cs(B,3*n) |
| 5 | ABAcs(B,1*n)A; Bcs(B,1*n)cs(B,2*n)cs(B,3*n) cs(B,4*n) |
| 6 | ABAcs(B,1*n)Acs(B,2*n); ABAAAcs(B,1)A; Bcs(B,1*n)cs(B,2*n)cs(B,3*n) cs(B,4*n) cs(B,5*n) |
| 7 | ABAcs(B,1*n)Acs(B,2*n)A; ABAAAcs(B,1)A; Bcs(B,1*n)cs(B,2*n)cs(B,3*n) cs(B,4*n) cs(B,5*n) cs(B,6*n) |

FIG. 8
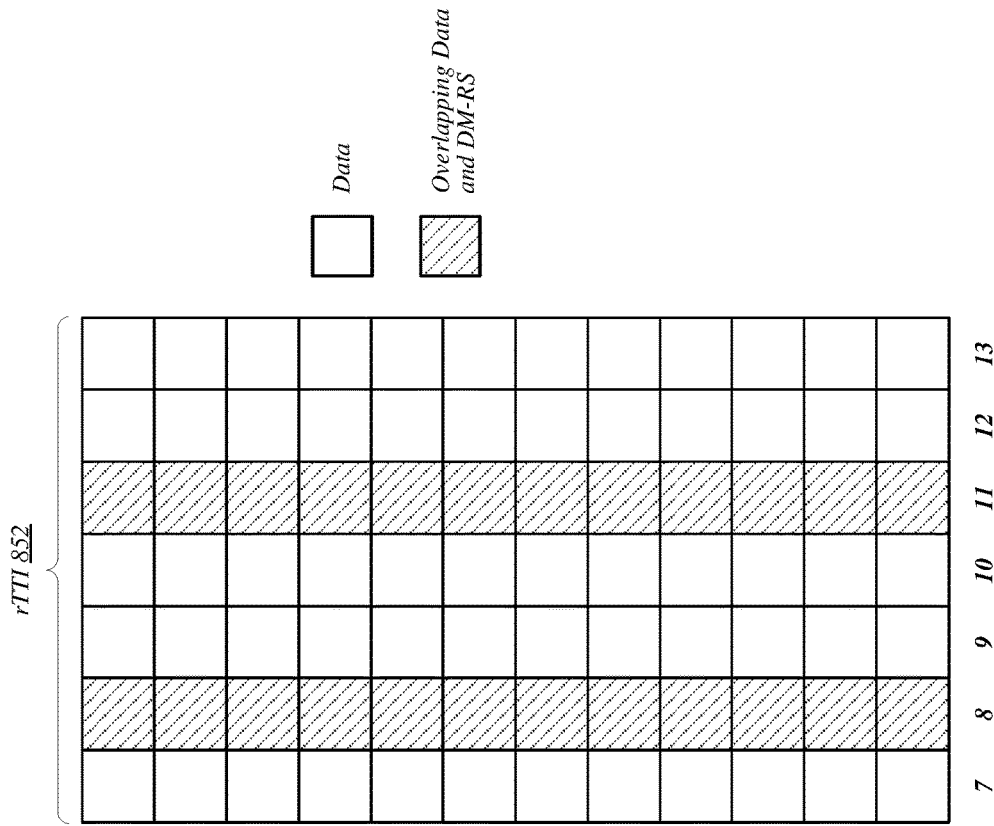
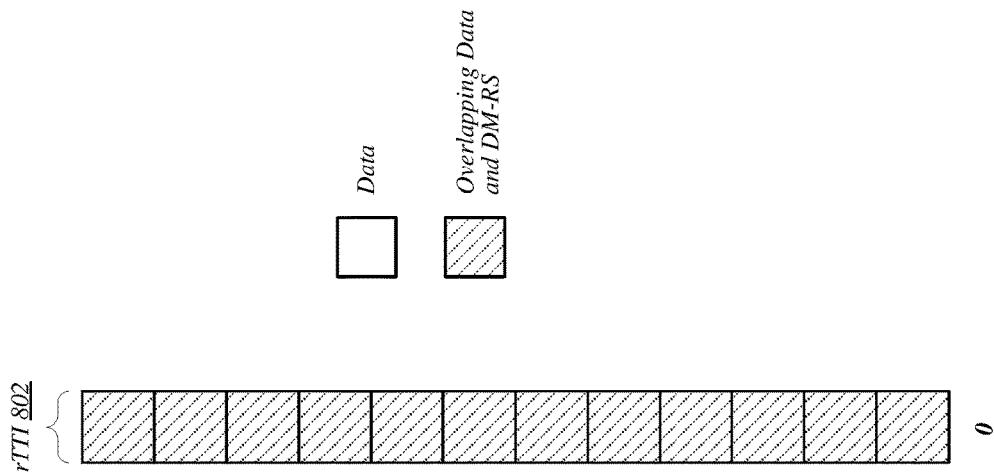

```
┌─────────────────────────────────────────┐
│ ACCESS CONTROL INFORMATION FOR rTTI BLOCK│
│ COMPRISING PLURALITY OF rTTIs INCLUDING  │
│        ONE OR MORE rTTIs ASSIGNED TO UE  │
│                  1702                    │
└─────────────────────────────────────────┘
                    │
                    ▼
┌─────────────────────────────────────────┐
│ IDENTIFY RESOURCES OF EACH OF THE ONE OR │
│    MORE rTTIs BASED ON CONTROL INFORMATION│
│                  1704                    │
└─────────────────────────────────────────┘
                    │
                    ▼
┌─────────────────────────────────────────┐
│      WIRELESSLY COMMUNICATE WITH eNB VIA │
│  RESOURCES OF AT LEAST ONE OF ONE OR MORE rTTIs │
│                  1706                    │
└─────────────────────────────────────────┘
```

FIG. 20
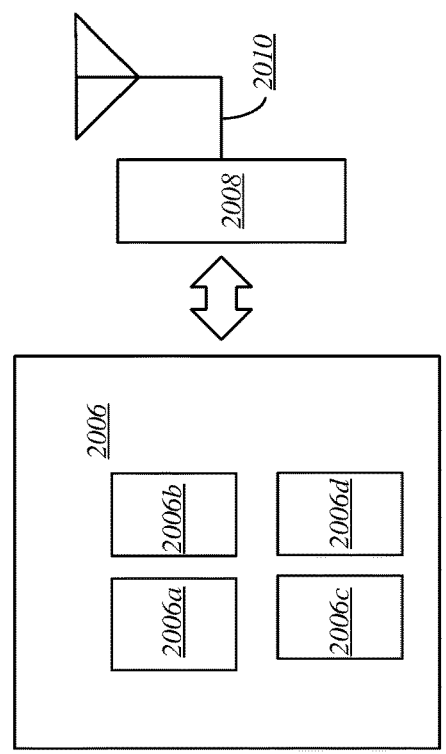
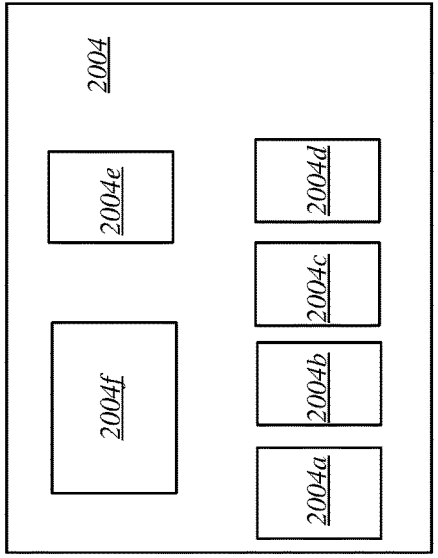
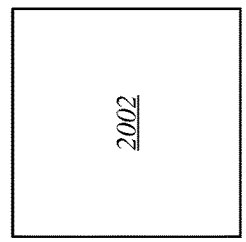

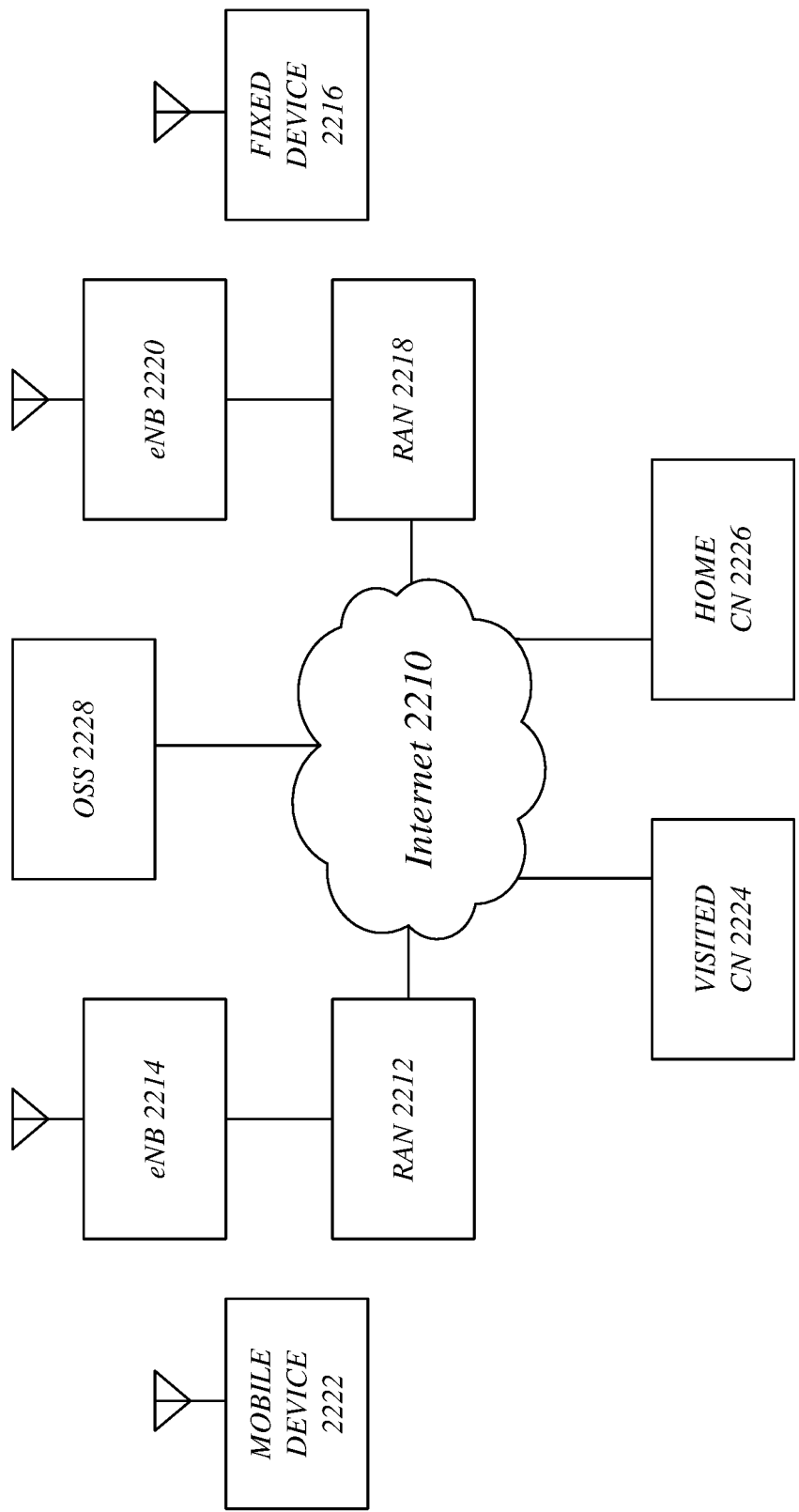

LATENCY REDUCTION TECHNIQUES FOR RADIO ACCESS NETWORKS

RELATED CASE

This application is a national stage application claiming the benefit of and priority to International Application No. PCT/US2015/067331 entitled "Latency Reduction Techniques for Radio Access Networks" filed Dec. 22, 2015, which claims priority to U.S. Provisional Patent Application No. 62/169,276, filed Jun. 1, 2015, U.S. Provisional Patent Application No. 62/169,946, filed Jun. 2, 2015, and U.S. Provisional Patent Application No. 62/169,956, filed Jun. 2, 2015. All of the above are hereby incorporated by reference in their entirety.

TECHNICAL FIELD

Embodiments herein generally relate to communications between devices in broadband wireless communications networks.

BACKGROUND

Latency reduction for Long-Term Evolution (LTE) has been identified as an important consideration with respect to the future path of LTE. As noted in a recent study item proposal, reducing latency can increase throughput by improving the performance of transmission control protocol (TCP) in the upper layers, by reducing the impact of TCP slow start, a major limiting factor for small size packets. Furthermore, reducing the air interface latency of LTE can enable a new, emerging category of services known as ultra-low latency and mission critical traffic. Such new services were identified as important for use cases such as vehicular networks, among others, in a 5G White Paper published by the influential Next Generation Mobile Networks (NGMN) alliance of mobile operators. Ultra-low latency services are expected to require one-way air interface latency to be on the order of 1 millisecond or less, which is represents a significant reduction with respect to current LTE latency.

BRIEF DESCRIPTION OF THE DRAWINGS

FIG. 3 illustrates embodiments of second and third reference signal designs.

FIG. 5 illustrates an embodiment of a multiplexing pattern table.

FIG. 8 illustrates embodiments of sixth and seventh reference signal designs.

FIG. 9 illustrates embodiments of eighth and ninth reference signal designs.

FIG. 17 illustrates an embodiment of a first logic flow.

FIG. 20 illustrates an embodiment of a first device.

FIG. 22 illustrates an embodiment of a wireless network.

DETAILED DESCRIPTION

Figure 1A:
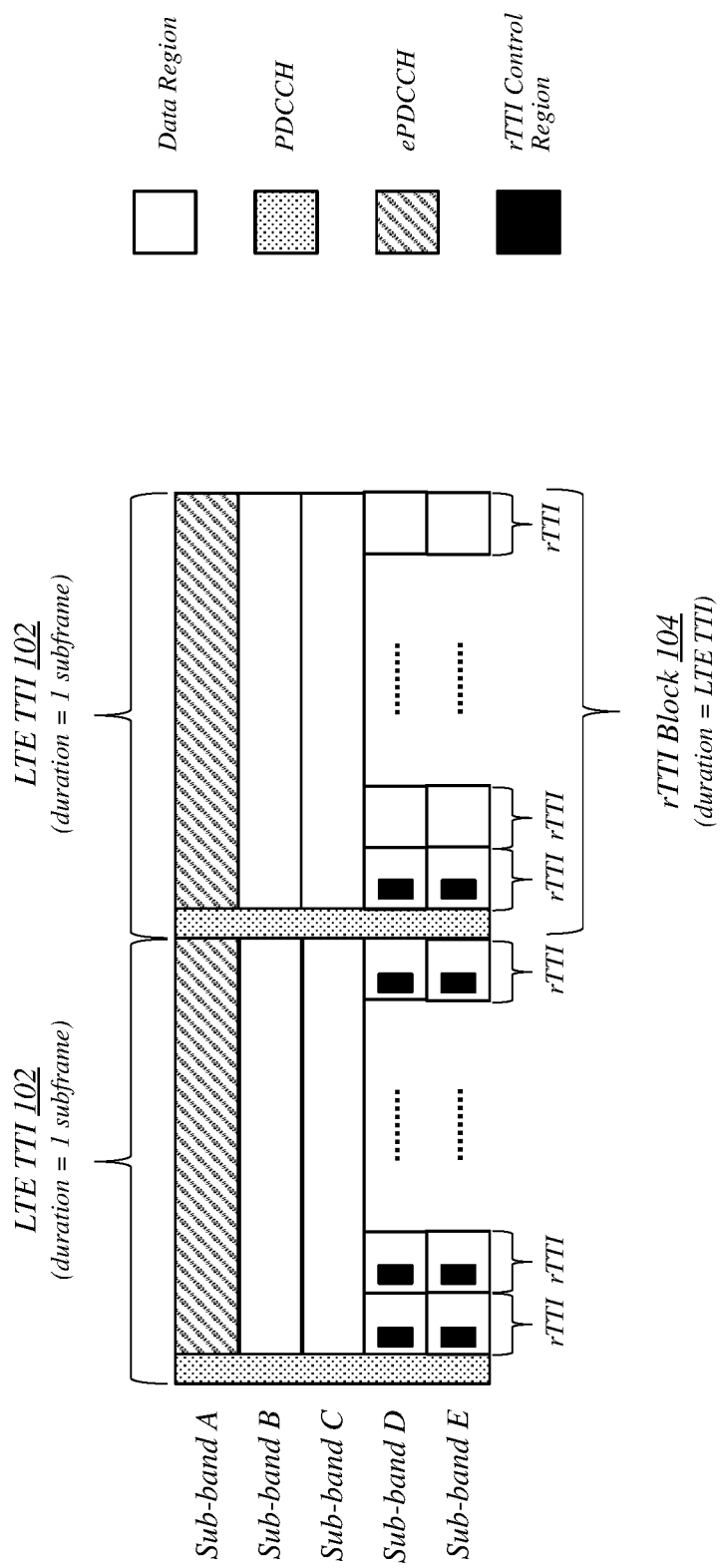
FIG. 1A illustrates an embodiment of a transmission timing diagram.

Various embodiments may be generally directed to latency reduction techniques for radio access networks. In some embodiments, a reduced transmission time interval (rTTI) may be implemented in order to reduce air interface latency in a radio access network. In various embodiments, an rTTI block may be defined, and some operations may be performed in rTTI block-wise fashion in order to reduce the marginal overhead associated with implementation of the rTTI. In some embodiments in which an rTTI is implemented, demodulation reference signal (DM-RS) granularity may be improved by use of techniques that enable data and reference signals to be multiplexed within a same orthogonal frequency division multiplexing (OFDM) symbol. In various embodiments, a current transmission time interval (TTI) may be maintained, and latency reduction may be achieved via the use of novel techniques for one or more of code block (CB) segmentation, uplink (UL) resource element (RE) mapping, and hybrid automatic repeat request (HARQ) cycle timing. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

The techniques disclosed herein may involve transmission of data over one or more wireless connections using one or more wireless mobile broadband technologies. For example, various embodiments may involve transmissions over one or more wireless connections according to one or more 3rd Generation Partnership Project (3GPP), 3GPP Long Term Evolution (LTE), and/or 3GPP LTE-Advanced (LTE-A) technologies and/or standards, including their revisions, progeny and variants. Various embodiments may additionally or alternatively involve transmissions according to one or more Global System for Mobile Communications (GSM)/Enhanced Data Rates for GSM Evolution (EDGE), Universal Mobile Telecommunications System (UMTS)/ High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA200 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u. IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any revisions, progeny, and/or variants of any of the above. The embodiments are not limited to these examples.

In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

In a radio access network, one factor that may significantly influence air interface latency is the minimum time scheduling unit. In an LTE evolved UMTS Terrestrial Radio Access Network (E-UTRAN), the minimum time scheduling unit is the transmission time interval (TTI), which comprises a duration of one subframe (1 millisecond, or 14 OFDM symbols). Reducing the TTI to one slot (0.5 ms, or 7 OFDM symbols), or even further to one or few OFDM symbols, may enable a significant reduction in latency. However, implementing a reduced TTI (rTTI) may tend to result in increased amounts of various types of overhead, such as overhead associated with scheduling-related control information, HARQ feedback, and DM-RS reference signals.

In various embodiments, in order to reduce the marginal overhead associated with implementation of an rTTI, an rTTI block may be defined to enable some types of operations to be performed in an rTTI block-wise fashion that involves less overhead. In some embodiments, scheduling may be performed on an rTTI block-wise basis, eliminating the need for individual TTI scheduling information in the control channel. In various embodiments, respective HARQ feedback corresponding to multiple rTTI contained in an rTTI block may be transmitted jointly, once the entire rTTI block has been processed, rather than being transmitted individually on a per-rTTI basis. In some embodiments, rTTI block-wise scheduling may enable the density of reference signals to be reduced, by exploiting the correlation of channel estimates in the time domain, to a level comparable to the legacy TTI length.

FIG. 1A illustrates an example of a transmission timing diagram 100 that may be representative of various embodiments. As reflected in transmission timing diagram 100, in some embodiments, an rTTI may coexist with the legacy LTE TTI. In this example, use of an LTE TTI and an rTTI are multiplexed in the frequency domain, occupying disjoint sets of physical resource blocks (PRBs) in respective frequency sub-bands. The LTE TTI 102, which comprises a duration of one subframe, is used in sub-bands A, B, and C, while the rTTI is used in sub-bands D and E. During a first LTE TTI 102, per-rTTI scheduling is used in sub-bands D and E. and thus each rTTI in sub-bands D and E within the first LTE TTI 102 contains both data and control regions. During a second LTE TTI 102, rTTI block-wise scheduling is used in sub-bands D and E, according to which a control region in a first rTTI contains all of the scheduling information for the entire rTTI block 104, and thus control regions are not needed in the rest of the rTTIs of the block. In this example, the length of rTTI block 104 happens to be equal to the length of each LTE TTI 102. In various embodiments, setting the rTTI block length to equal the legacy LTE TTI of one subframe may have significant advantages in terms of re-using legacy LTE control and reference signals. However, it is to be appreciated that other rTTI block sizes are both possible and contemplated, and the embodiments are not limited in this context.

Figure 1B:
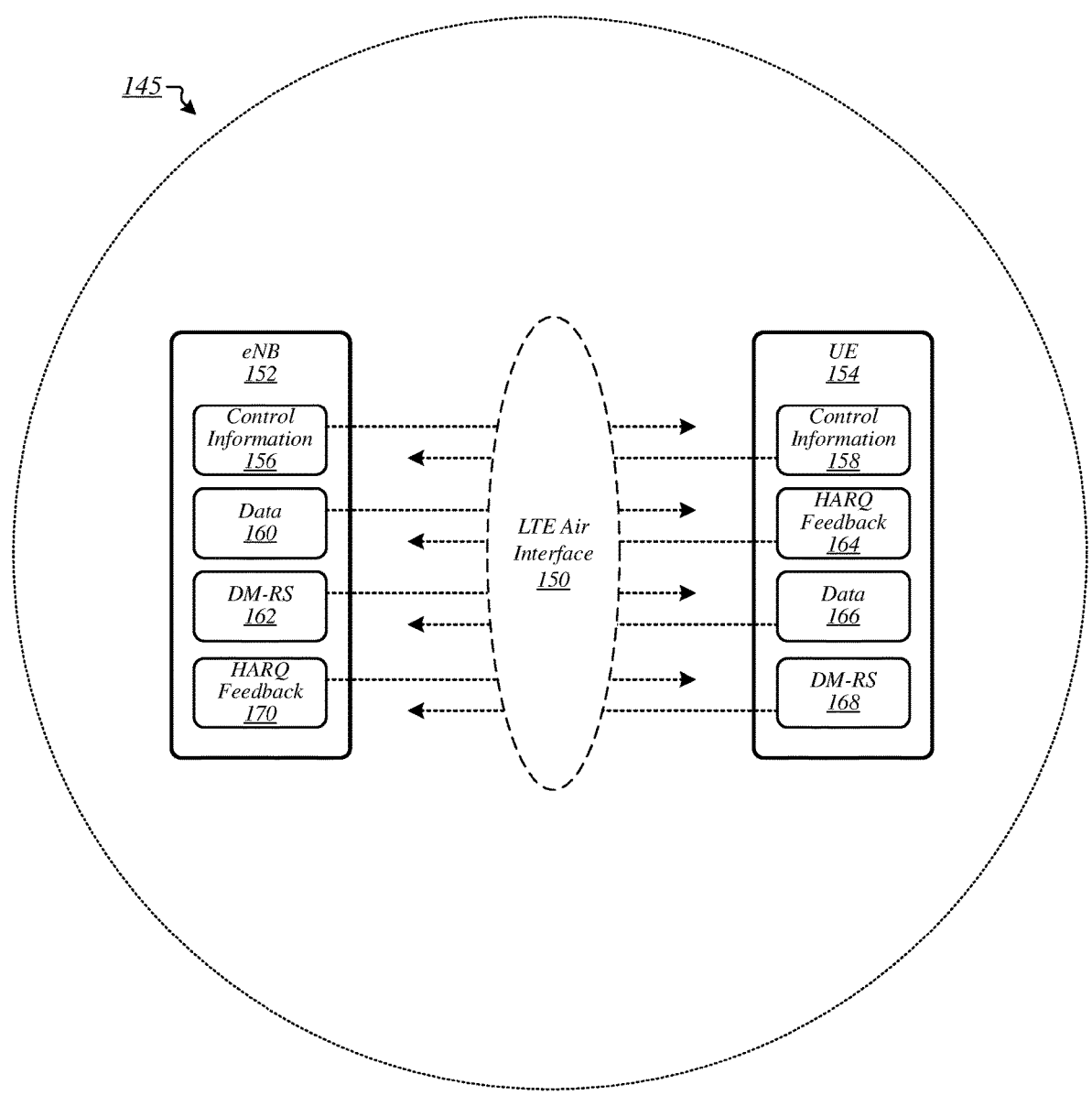
FIG. 1B illustrates an embodiment of an operating environment.

FIG. 1B illustrates an example of an operating environment 140 that may be representative of some embodiments. In operating environment 140, an eNB 152 and a UE 154 may exchange various types of wireless communications over an LTE air interface 150 in a radio access network cell 145. In various embodiments, radio access network cell 145 may comprise a cell of an E-UTRAN. In some embodiments, eNB 152 may transmit control information 156 to UE 154. In various embodiments, eNB 152 may transmit control information 156 to UE 154 over a physical downlink control channel (PDCCH) or an enhanced physical downlink control channel. In some embodiments, control information 156 may comprise scheduling information that identifies channel resources that have been scheduled for use in conjunction with wireless communication between eNB 152 and UE 154.

In various embodiments, control information 156 may comprise downlink scheduling information, and may comprise information identifying channel resources that have been scheduled for use by eNB 152 to transmit data 160 to UE 154. In some embodiments, eNB 152 may transmit data 160 to UE 154 using physical downlink shared channel (PDSCH) resources specified by control information 156. In various embodiments, in conjunction with transmission of data 160 over the PDSCH, eNB 152 may also transmit demodulation reference signals (DM-RS) 162 over the PDSCH. In some embodiments, UE 154 may transmit HARQ feedback 164 to eNB 152 in order to inform eNB 152 of whether UE 154 has successfully received data 160. In various embodiments, UE 154 may transmit HARQ feedback 164 to eNB 152 over a physical uplink control channel (PUCCH) or physical uplink shared channel (PUSCH).

In some embodiments, UE 154 may transmit control information 158 to eNB 152. In various embodiments, UE 154 may transmit control information 158 over the PUCCH. In some embodiments, control information 158 may comprise a request for eNB 152 to schedule channel resources for use by UE 154 to transmit data 166 to eNB 152. In various embodiments, in response to such a request, eNB 152 may allocate physical uplink share channel (PUSCH) resources to UE 154 for use in transmitting data 166 and may send control information 156 to UE 154 to notify it of those allocated resources. It is worthy of note that in some embodiments, if UE 154 transmits data to eNB 152 over the PUSCH during the same time interval as that during which it transmits control information 158, then UE 154 may transmit control information 158 over the PUSCH as well, rather than the PUCCH. In various embodiments, UE 154 may then transmit data 166 to eNB 152 using the PUSCH resources specified by that control information 156. In some embodiments, in conjunction with transmission of data 166 over the PUSCH, UE 154 may also transmit DM-RS signals 168 over the PUSCH. In various embodiments, eNB 152 may transmit HARQ feedback 170 to UE 154 in order to inform UE 154 of whether eNB 152 has successfully received data 160. In some embodiments, eNB 152 may transmit HARQ feedback 170 to UE 104 over a physical HARQ indicator channel (PHICH).

In various embodiments, an rTTI may be implemented in radio access network cell 145 in order to reduce latency associated with communications over LTE air interface 150. In some embodiments, in order to reduce the marginal overhead associated with implementation of the rTTI, one or more of the aforementioned operations may be conducted in an rTTI block-wise fashion. In various embodiments, different rTTI block sizes may be defined to provide additional flexibility and enable further overhead reductions. In some embodiments, some operations may be performed on an rTTI block-wise basis and others may be performed on a per-rTTI basis. For example, in various embodiments, it may be possible to schedule individual rTTI but, taking into consideration previously scheduled rTTI within an rTTI block, permit some DM-RS signals to not be transmitted and the resources to be used to transmit data instead. Similarly, in some embodiments, a rTTI block-wise HARQ feedback mechanism may be implemented while per-rTTI scheduling is used. The embodiments are not limited to these examples.

In various embodiments, eNB 152 may conduct resource scheduling on an rTTI block-wise basis. In some embodiments, in conjunction with rTTI block-wise scheduling operations, eNB 152 may allocate resources of an rTTI block for use in conjunction with wireless communications between eNB 152 and UE 154. In various embodiments, eNB 152 may allocate PDSCH resources of the rTTI block for its own use in transmitting data to UE 154. In some embodiments, eNB 152 may allocate PUSCH resources of the rTTI block for use by UE 154 in transmitting data to eNB 152. In various embodiments, eNB 152 may send rTTI block-wise scheduling information to UE 154 in order to inform UE 154 of the allocated resources of the rTTI block. In some embodiments. UE 154 may be configured through upper layer signaling to operate in an rTTI block mode. In various embodiments, operating in the rTTI block mode may enable UE 154 to receive rTTI block-wise scheduling information via legacy control information formats, such as legacy formats for communication of such control information over the PDCCH or ePDCCH. In some embodiments, operating in the rTTI block mode may enable UE 154 to receive DM-RS signals via a legacy DM-RS location defined for the PDSCH.

In various embodiments, eNB 152 may be able schedule an rTTI block such that different rTTIs of the block are assigned to different UEs. In some embodiments, eNB 152 may schedule an rTTI block to be shared among multiple UEs according to a pattern associated with an rTTI block sharing format. In an example embodiment, eNB 152 may schedule an rTTI block to be shared by UE 154 and a second UE according to a pattern comprising alternating, from rTTI to rTTI in the rTTI block, between UE 154 and the second UE. In various embodiments, if UE 154 is to share an rTTI block with one or more other UEs, higher layer signaling may be used to inform UE 154 of which of the rTTIs of the block are assigned to UE 154. In some embodiments, this information may be conveyed via a predetermined flag or via an identifier of a defined rTTI block sharing format. In various embodiments, respective DM-RS resource element (RE) locations may be selected for each rTTI block sharing format in order to improve/optimize DM-RS granularity. The embodiments are not limited in this context.

In some embodiments, the higher layer may be able to dimension the resource region for rTTI block mode in the time domain, the frequency domain, or both. In various embodiments, the higher layer may perform time domain configuration, according to which particular subframes may be designated as rTTI block mode subframes. In some embodiments, the higher layer may perform frequency domain configuration, according to which particular sub-bands may be designated as rTTI block mode sub-bands. In various embodiments, these two techniques may be used in combination. The embodiments are not limited in this context.

In some embodiments, while UE 154 operates in rTTI block mode, a HARQ process may be mapped to each rTTI transport block (TB). In various embodiments, UE 154 may aggregate HARQ feedback for all of the rTTIs within an rTTI block and send the aggregated HARQ feedback to eNB 152 in a single block-wise HARQ feedback message. In some embodiments, the block-wise HARQ feedback message may provide the aggregated HARQ feedback in the form of an N-bit word, with one bit corresponding to each of N rTTIs in the rTTI block. In various embodiments, eNB 152 may provide rTTI block-wise HARQ feedback to UE 154 in analogous fashion. In some embodiments, the rTTI block length may equal the LTE TTI of 1 subframe, and mechanisms defined by LTE for conventional HARQ feedback may be used. In various embodiments, since channel decoding is done in each rTTI, the decoding/encoding budgets may be shorter than those associated with the legacy system using a conventional 1 subframe TTI. Thus, assuming the length of the rTTI block is 1 ms (the same as 1 subframe), the aggregated HARQ-ACK feedback corresponding an rTTI block in subframe n may be sent in subframe n+X (where X<4). As a specific example, X may be equal to 2, corresponding to a 1 subframe margin considering timing advance and decoding/encoding time budget. The embodiments are not limited to this example.

In some embodiments, UE 154 may use a legacy control signal format, such as PUCCH format 2 or PUCCH format 3, to provide aggregated HARQ feedback for rTTI block-based downlink data transmissions. In various embodiments, UE 154 may wait for an entire rTTI block to be received and accumulate HARQ feedback. Then, UE 154 may use the PUCCH or PUSCH in order to feed back a coded N-bit word containing values 1 for ACK and 0 for NACK for each individual rTTI in the rTTI block. In some embodiments, UE 154 may feed back a single collective ACK or NACK of all of the data transmitted during the rTTI block. For example, in various embodiments. UE 154 may feed back the values '111' in order to indicate a collective ACK, and may feed back the values '000' to indicate a collective NACK. The embodiments are not limited to this example.

In some embodiments, with respect to HARQ feedback for rTTI block-based uplink transmissions, the PHICH may be modified to carry encoded ACK/NACK words, with each uncoded bit representing one rTTI within the block and taking values 1 for ACK and 0 for NACK. In various embodiments, for N rTTI/block, N bits may be further encoded to produce an r*N bit word, with r being the code rate. In LTE, ACK/NACK is encoded with a rate 1/3 repetition code, taking values '111' or '000'. In some embodiments, the same code may be used in conjunction with rTTI block-based HARQ feedback. In various other embodiments, a higher rate may be used in order to reduce PHICH overhead. In some embodiments, the unmodified PHICH may be used to feed back a single collective ACK/NACK value for the rTTI block, taking values '111' when all rTTI are received correctly and '000' otherwise. The embodiments are not limited to this example.

Figure 2:
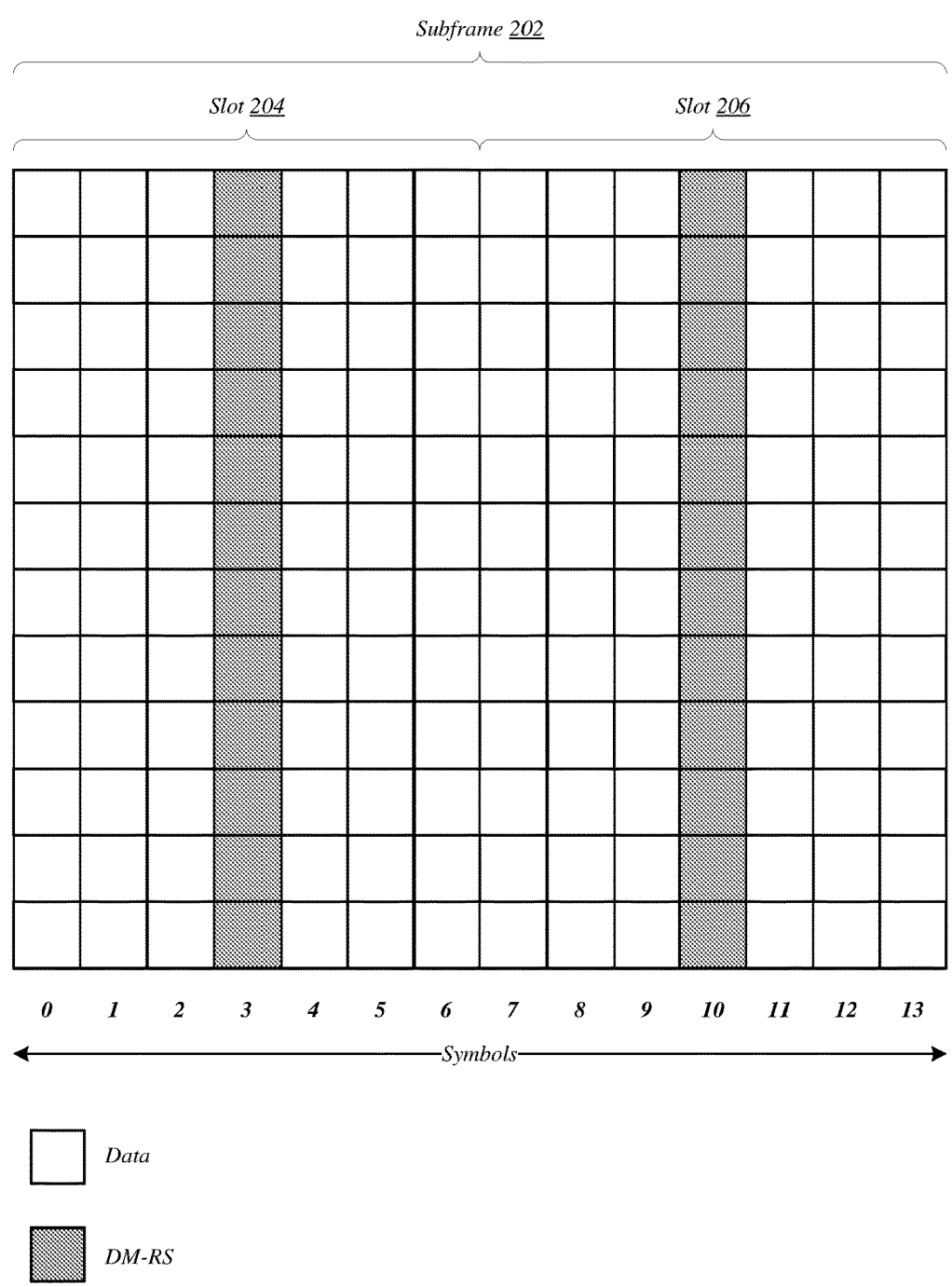
FIG. 2 illustrates an embodiment of a first reference signal design.

FIG. 2 illustrates an embodiment of a reference signal design 200 that may be representative of the DM-RS signal design used in conventional LTE systems. As shown in FIG. 2, according to the conventional DM-RS signal design, two symbols per subframe are used for DM-RS signals. In this example, the symbols used for DM-RS signals are the shaded symbols 3 and 10. Subframe 202 comprises slots 204 and 206. The first DM-RS signal subframe, subframe 3, is comprised in slot 204. The second DM-RS signal subframe, subframe 10, is comprised in slot 206. If an rTTI of 1 slot is implemented, only one DM-RS symbol will be available per slot.

In conjunction with implementing an rTTI, it may be desirable to have more granularity in the DM-RS signal so that overhead can be managed and a more reliable channel estimation may be achieved. In order to increase granularity, it may be desirable that data and reference signals are combined in a given symbol interval. Described herein are techniques that may enable data and reference signals to be combined in such fashion. In various embodiments, data and Jo reference signals may be multiplexed in the frequency domain. In some embodiments, this may simplify channel estimation, since reference symbols are not contaminated by data. In various embodiments, data and reference signals may be multiplexed in the time domain. In some embodiments, this may provide a higher number of reference samples but may require more complex receiver processing. In various embodiments, the symbol duration may be reduced in order to enable transmission one or more data symbols and a reference symbol in a same symbol interval. In some embodiments, subcarrier spacing may be effectively increased by the same factor as that by which the symbol interval is reduced. In various embodiments, for example, the symbol interval may be halved and the subcarrier spacing may be effectively increased from 15 kHz to 30 kHz. In some embodiments, the cyclic prefix (CP) may be divided into two in order to cover two shortened symbols (e.g. 2.5 us for each divided symbol). In various embodiments, OFDMA modulation may be used to multiplex data and reference signals in the frequency domain. The embodiments are not limited in this context.

FIG. 3 illustrates an embodiment of a reference signal design 300 and an embodiment of a reference signal design 350, both of which may be representative of DM-RS signal designs that may be implemented in some embodiments in order to improve DM-RS granularity in conjunction with the use of an rTTI. Reference signal design 300 corresponds to an rTTI 302 comprising a duration of one OFDM symbol, while reference signal design 350 corresponds to an rTTI 352 comprising a duration of one slot. According to reference signal designs 300 and 350, data and reference signals are multiplexed in the frequency domain, such that different sub-carriers are used to transmit data and reference signals in any given OFDM symbol during which reference signals are transmitted.

Figure 4:
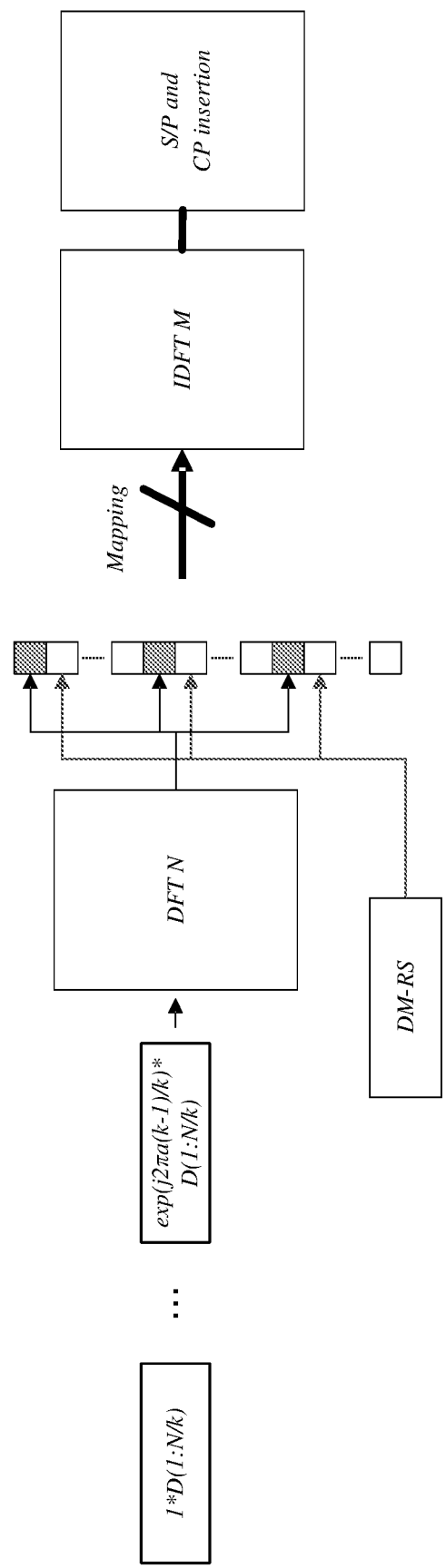
FIG. 4 illustrates an embodiment of a mapping process.

FIG. 4 illustrates an embodiment of a mapping process 400 that may be representative of a first approach to facilitating the multiplexing of data and reference signals in the frequency domain according to various embodiments. Denote by N the total number of sub-carriers allocated to a given UE, by Nd the number of data symbols, and by Nrs the number of reference symbols, with Nd+Nrs=N. With respect to mapping process 400, Nd may be selected to be equal to N/k, with integer k. According to mapping process 400, a block of Nd data symbols is first repeated k times and then multiplied block-wise by a phase vector $\varphi=[1\ \exp(j2\pi a/k), \ldots \exp(j2a(k-1)/k)]$, where 'a' takes an integer value between 0 and N/Nd-1. After this procedure, the usual DFT spreading with DFT size N yields an interleaved allocation of sub-carriers, where subcarriers a+bk, b=1, 2, . . . Nd contain data symbols. The remainder of sub-carriers within block N is empty, and can be used to insert a reference signal in the frequency domain. In some embodiments, a shortened DM-RS sequence or a different sequence may be used.

A second approach that may be used to facilitate multiplexing data and reference signals in the frequency domain in various embodiments may include using a different DFT size Nd to spread data symbols, and then mapping symbols in a subset of the N sub-carriers of the block. In some embodiments, this approach may offer more flexibility since any value for Nd may be possible. If Nd=N/k, then this approach may be the same as the approach embodied in mapping process 400, if the frequency mapping is done in an interleaved manner in the frequency domain.

At the receiver, according the either the first approach or the second approach, reference symbols may be used in the frequency domain to estimate the channel and may then be removed. In various embodiments, the remaining signal may first be equalized and may then be transformed with an IDFT of size N (according to the first approach) or Nd (according to the second approach). In some embodiments, data symbols may then be retrieved in the time domain. The embodiments are not limited in this context.

Data and reference signal multiplexing may offer a great deal of flexibility in the allocation of reference signals. In various embodiments, patterns may be defined that reduce the mean square error of channel estimation after applying a suitable interpolation method. FIG. 5 illustrates a multiplexing pattern table 500 that comprises examples of patterns that may be suitable for use in some embodiments.

In the "Example Patterns" column of multiplexing pattern table 500, 'A' denotes a symbol consisting entirely of data symbols. 'B' denotes a symbol consisting of interleaved reference and data symbols, consisting of a regular pattern, and starting with a pilot symbol. In various embodiments, such a symbol may be obtained via an approach described above. 'cs(B,a)' denotes a cyclic shift of B by 'a' subcarriers. In some embodiments, such a symbol may be obtained by phase vector multiplication, as described above. Multiplexing pattern table 500 comprises example patterns for rTTI sizes ranging from 1 to 7 symbols. In various embodiments, a suitable value for 'n' may be defined based on various considerations, which may vary from embodiment to embodiment. It is to be appreciated that other patterns and/or combinations of 'A' and cyclic shifts of B may be defined in some embodiments, and the embodiments are not limited to the examples listed in multiplexing pattern table 500.

Figure 6:
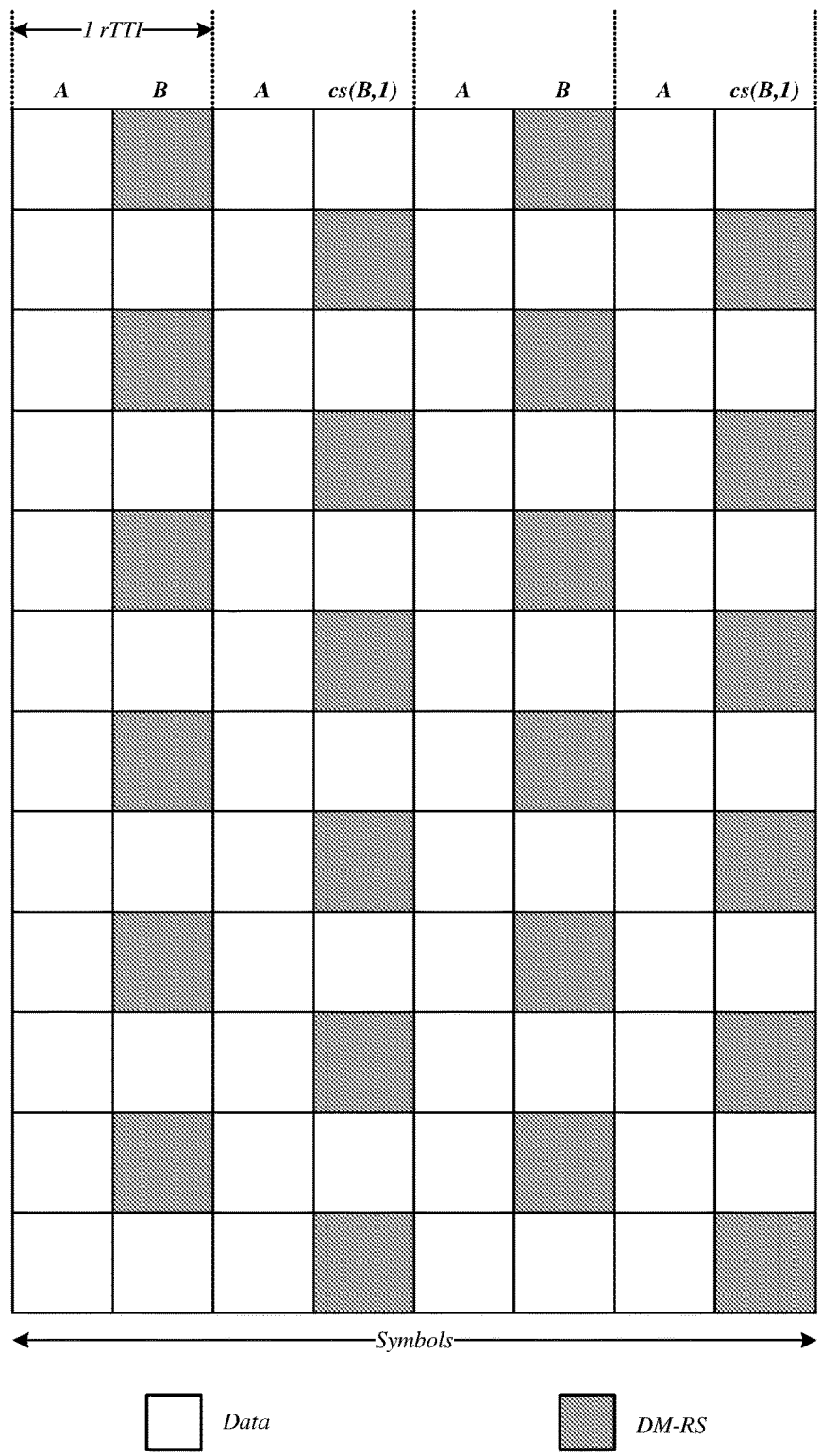
FIG. 6 illustrates embodiments of a fourth reference signal design.
Figure 7:
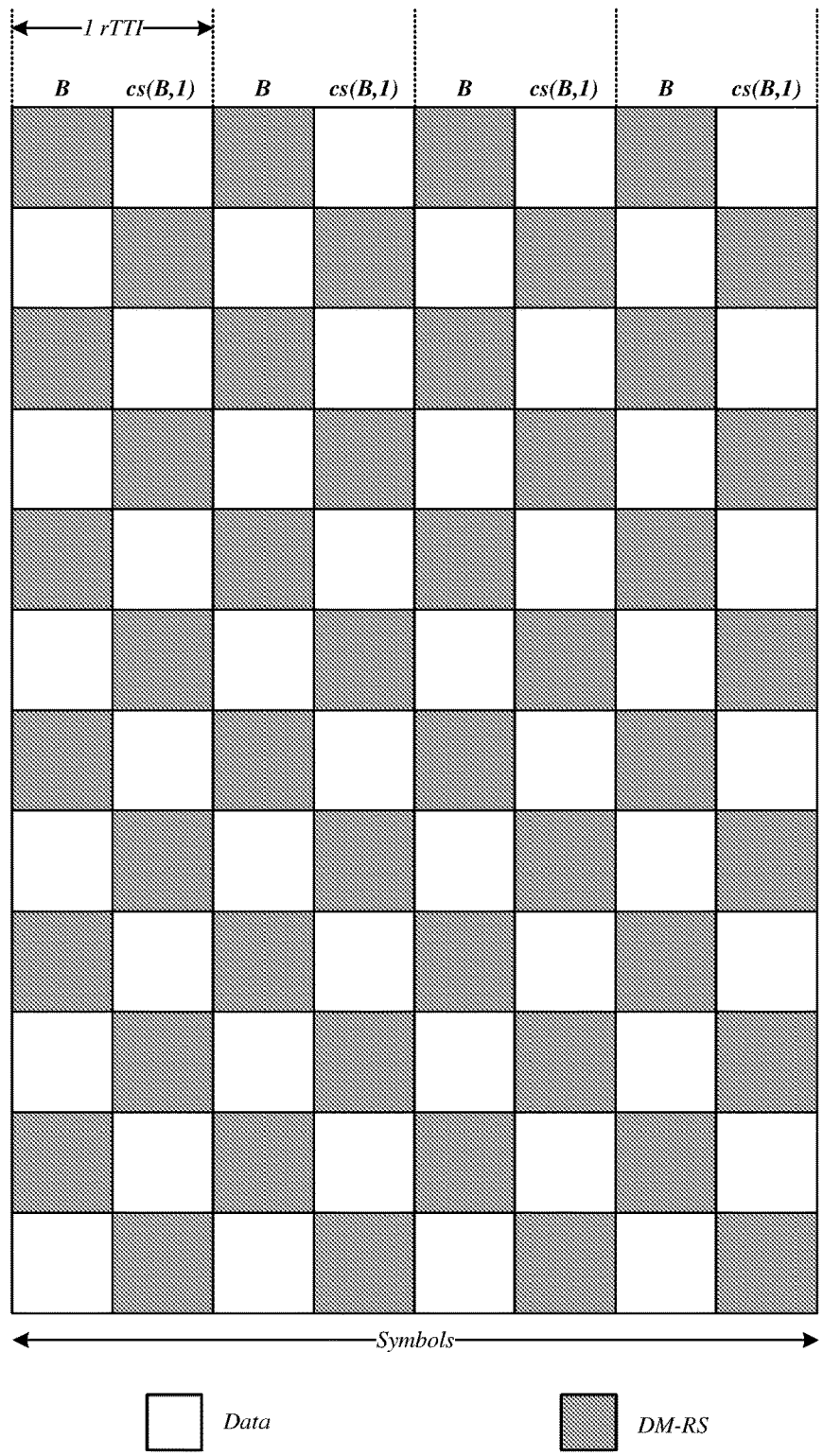
FIG. 7 illustrates embodiments of a fifth reference signal design.

FIGS. 6 and 7 illustrate respective reference signal designs 600 and 700. Reference signal designs 600 and 700 both reflect the use of an rTTI of 2 symbols with k=2, and illustrate respective example multiplexing patterns comprised in multiplexing pattern table 500 of FIG. 5. Reference signal design 600 corresponds to the multiplexing pattern 'ABAcs(B,1)'. Reference signal design 700 corresponds to the multiplexing pattern 'Bcs(B,1)Bcs(B,1)'. The embodiments are not limited to these examples.

In various embodiments, OFDMA modulation may be used in order to multiplex data and Jo reference signals in the frequency domain. In some embodiments, patterns of multiplexing pattern table 500 may be readily used if OFDM rather than SC/FDMA is used for uplink transmission. In various embodiments, it may be possible to adopt a symmetric DM-RS pattern for uplink and downlink signals. The embodiments are not limited in this context.

FIG. 8 illustrates an embodiment of a reference signal design 800 and an embodiment of a reference signal design 850, both of which may be representative of DM-RS signal designs that may be implemented in some embodiments in order to improve DM-RS granularity in conjunction with the use of an rTTI. Reference signal design 800 corresponds to an rTTI 802 comprising a duration of one OFDM symbol, while reference signal design 850 corresponds to an rTTI 852 comprising a duration of one slot. According to reference signal designs 800 and 850, data and reference signals are multiplexed in the time domain, such that overlapping data and reference signals are transmitted over each subcarrier during any given OFDM symbol during which reference signals are transmitted.

In various embodiments, in conjunction with multiplexing data and reference signal in the time domain, a data block of size Nd and a time domain reference signal of size Nrs, with Nd+Nrs=N, may be generated in the time domain. In some embodiments, the two blocks may then be combined into a size N block and transformed with a size N DFT. In various embodiments, this approach may mix data and reference signals in the frequency domain. In some embodiments, more advanced receiver techniques may be needed in order to separate them. The embodiments are not limited in this context.

Figure 9:
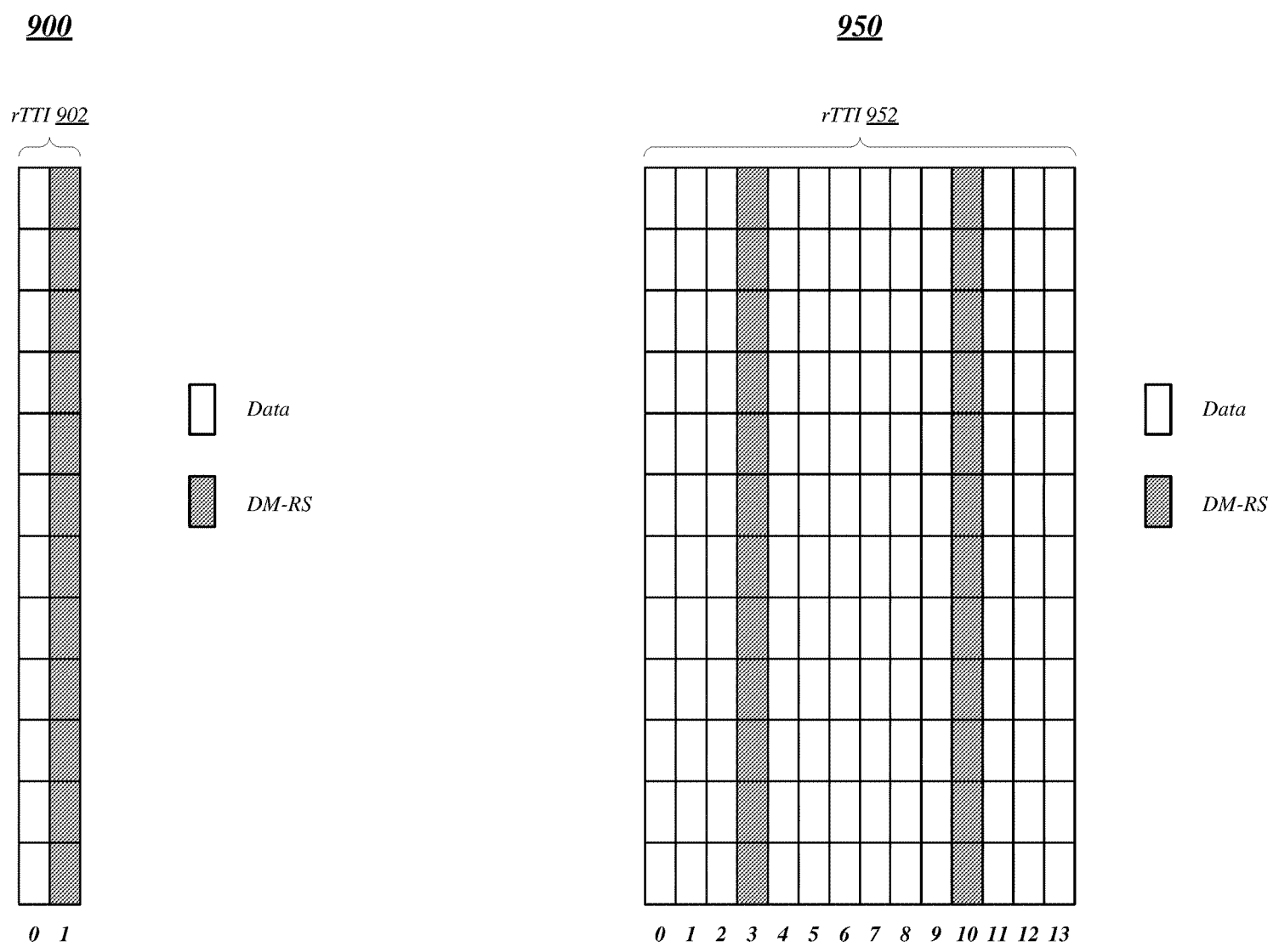

FIG. 9 illustrates an embodiment of a reference signal design 900 and an embodiment of a reference signal design 950, both of which may be representative of DM-RS signal designs that may be implemented in various embodiments in order to improve DM-RS granularity in conjunction with the use of an rTTI. Reference signal design 900 corresponds to an rTTI 902 comprising a duration of one OFDM symbol, while reference signal design 950 corresponds to an rTTI 952 comprising a duration of one slot. According to reference signal designs 900 and 950, the symbol duration is halved, such that one data symbol and one reference symbol are transmitted within a same OFDM symbol interval over each subcarrier during any given OFDM symbol during which reference signals are transmitted.

In some embodiments, it may be possible to provide sufficient reference symbols for even very short rTTIs by increasing the sub-carrier spacing. In various embodiments, a shorter rTTI may comprise shorter symbols, corresponding to larger subcarrier spacing. In some embodiments, either multiplexed data-DM-RS patterns or pure DM-RS symbols can be used with increased sub-carrier spacing. In various embodiments, the original CP length may be distributed to shorter symbols. For example, if a shorter symbol is half of a standard symbol and Jo if the CP length for the standard symbol is 5 us, the length of each shorter symbol CP may be 2.5 us. The embodiments are not limited to this example.

In some embodiments, a conventional LTE TTI of 1 subframe may be maintained, and latency reductions may be achieved via one or more alternate techniques. According to various techniques, received signals may be made available for processing earlier at the receiver, so that processing time, and overall latency, may be reduced. According to some techniques, a code block (CB) segmentation procedure may be modified so that code block decoding may begin at the receiver prior to receipt of the entire subframe. According to various such techniques, the modified CB segmentation procedure may use smaller CBs that take less time to process. In some embodiments, a modified UL resource element (RE) mapping may be implemented in conjunction with use of the modified CB segmentation procedure. In various embodiments, conventional LTE TTI and control channel formats may be maintained, and latency may be reduced according to techniques that involve moderate changes to the current standard. For ease of understanding, embodiments will be explained based on an FDD structure unless otherwise noted. However, it is to be appreciated that embodiments are not limited to this structure.

According to contemporary LTE procedures, a CB is not permitted to be larger than a maximum CB size Z of 6144 bits. If a codeword (CW) from a MAC layer transport block (TB) is too large enable its bits to fit within a single CB, a CB segmentation procedure is performed. According to the CB segmentation procedure, the CW is broken into multiple CBs, and cyclic redundancy checks (CRCs) are appended at the ends of each of the multiple CBs. Channel coding and rate matching are then applied on a per-CB basis, after which the data is concatenated and passed to the channel interleaver. For ease of explanation, a one-to-one mapping between TBs and CWs, such that the number of bits in a CW matches the number of bits in its TB, is assumed. However, it is to be appreciated that the embodiments are not limited in this context.

In some embodiments, a modified CB segmentation procedure may be implemented according to which each TB is divided into a fixed number C of CBs, where C is determined by upper layers. In various embodiments, each TB may be divided into a fixed number C of equal-size CBs. In some embodiments, filler bits may be used in order to reach appropriate CB sizes. It is worthy of note that in various embodiments, depending on the value of C and the TB size, a TB may be segmented into a greater number of CBs according to such a modified CB segmentation procedure than it would according to the conventional CB segmentation procedure that segments CBs only if they exceed 6144 bits and only into the minimum number of CBs needed to observe the 6144 bit limit. The embodiments are not limited in this context.

In some embodiments, a modified CB segmentation procedure may be implemented according to which a smaller value may be defined for the maximum CB size Z. In various embodiments, according to such a modified CB segmentation procedure, the upper layers may be able to configure Z to be equal to any of multiple possible values. For example, in some embodiments, a default value for Z may be defined to be 6144 bits, but upper layers may be able to configure Z to equal other values, such as 3072 bits or 1536 bits. In various embodiments, the value of Z may be defined as a function of a parameter N, which may be predetermined or configured by upper layers. In some such embodiments, for example, the maximum CB size Z may be given by one of Equations (1), (2), and (3), as follows:

$$Z = \frac{6144}{N} \quad \text{Equation (1)}$$

$$Z = \left\lceil \frac{6144}{N} \right\rceil \quad \text{Equation (2)}$$

$$Z = \left\lfloor \frac{6144}{N} \right\rfloor \quad \text{Equation (3)}$$

The embodiments are not limited to these examples.

Figure 10:
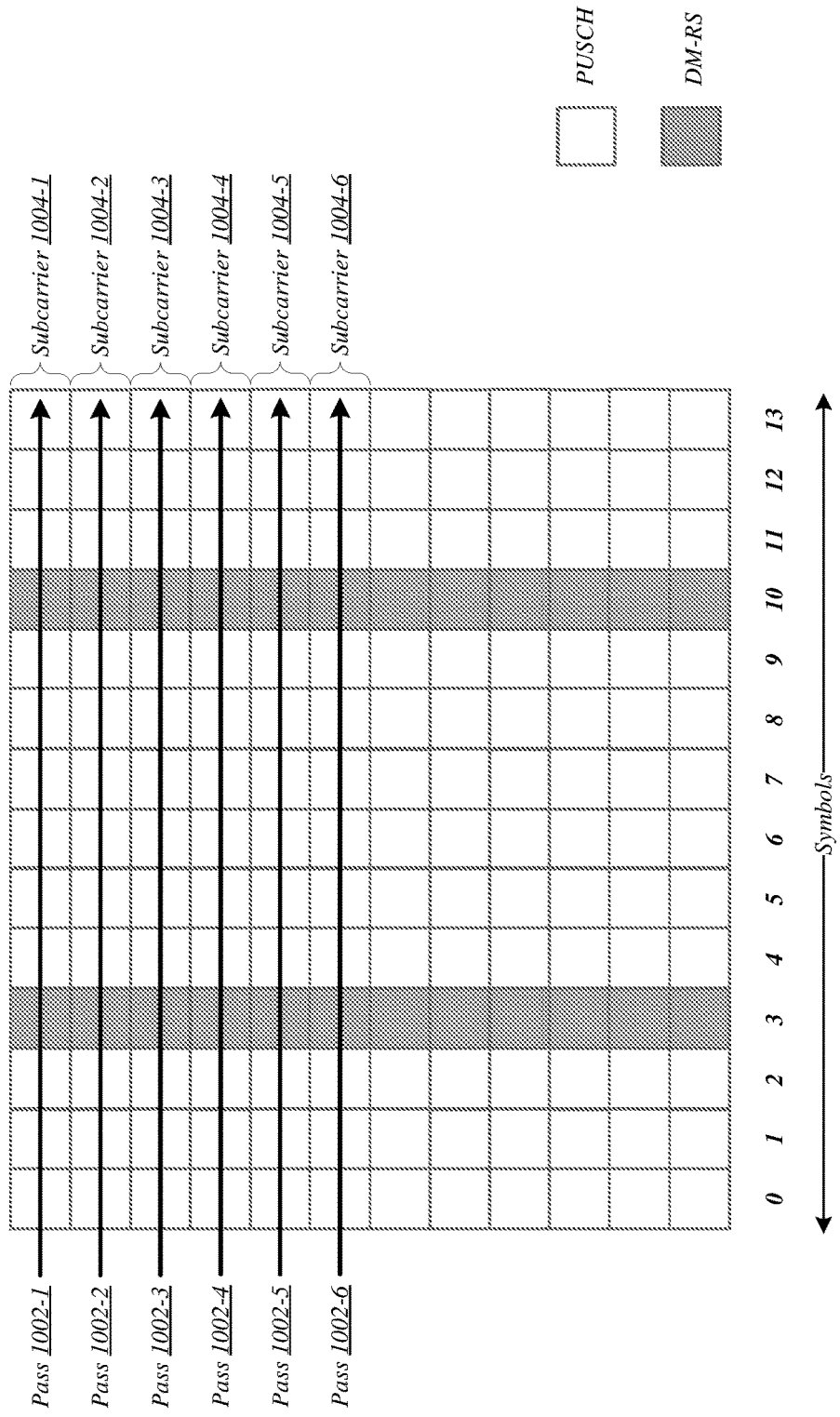
FIG. 10 illustrates an embodiment of a first mapping scheme.

FIG. 10 depicts a resource element (RE) mapping scheme 1000 that illustrates the manner in which rate-matched bits may be mapped to the REs of PUSCH resource blocks (RBs) according to contemporary LTE procedures. According to RE mapping scheme 1000, rate-matched bits are mapped to REs in a time-first manner, according to which the REs of an RB pair are filled in a row-wise fashion. During each of a series of mapping passes, rate-matched bits are mapped to the PUSCH REs of a respective subcarrier. For example, as shown in FIG. 10, the rate-matched bits associated with a given CB may be mapped to the PUSCH REs of subcarriers 1004-1 to 1004-6 during respective passes 1002-1 to 1002-6.

In various embodiments, mapping rate-matched bits to PUSCH REs in a time-first manner such as that illustrated in FIG. 10 may result in respective bits associated with a same CB being spread out across the entire breadth of the subframe during the very first mapping pass, even if the CB is relatively small. Since a receiver may need to receive all of the bits associated with the CB before it can begin decoding the CB, the generation of smaller CBs according to one of the aforementioned modified CB segmentation procedures may not enable the receiver to begin decoding any earlier when time-first PUSCH RE mapping is used. As such, with respect to the PUSCH, it may be desirable to implement a modified RE mapping scheme according to which all of the bits associated with a given CB may potentially be mapped to PUSCH REs comprised within a subset of the OFDM symbols of the subframe. In some embodiments, implementing such a modified RE mapping scheme in conjunction with one of the modified CB segmentation techniques discussed above may enable a receiver of a CB transmitted over the PUSCH to begin decoding that CB earlier than it would be able to according to contemporary LTE procedures.

Figure 11:
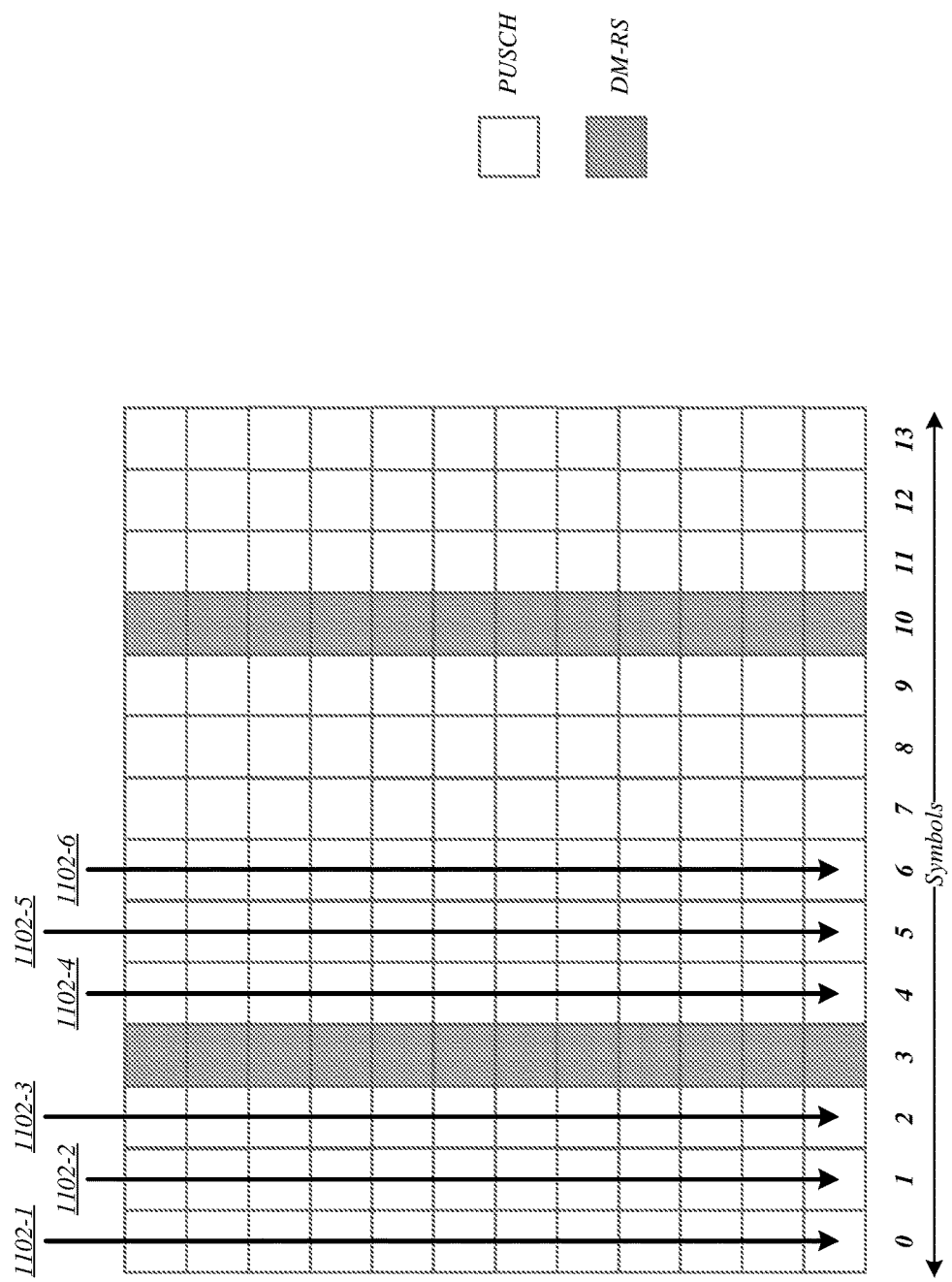
FIG. 11 illustrates an embodiment of a second mapping scheme.

FIG. 11 depicts an example of a modified RE mapping scheme that may be implemented Jo in various embodiments in order to support earlier decoding of CBs transmitted over the PUSCH. According to modified RE mapping scheme 1100, rate-matched bits are mapped to PUSCH REs in a frequency-first manner, according to which the PUSCH REs of an RB pair are filled in a column-wise fashion. During each of a series of mapping passes, rate-matched bits are mapped to the PUSCH REs of a respective OFDM symbol. For example, the rate-matched bits associated with the same CB as that discussed above in reference to FIG. 10 may be mapped to the REs of OFDM symbols 0 to 2 and 4 to 6 during respective passes 1102-1 to 1102-3 and 1102-4 to 1102-6.

Figure 12:
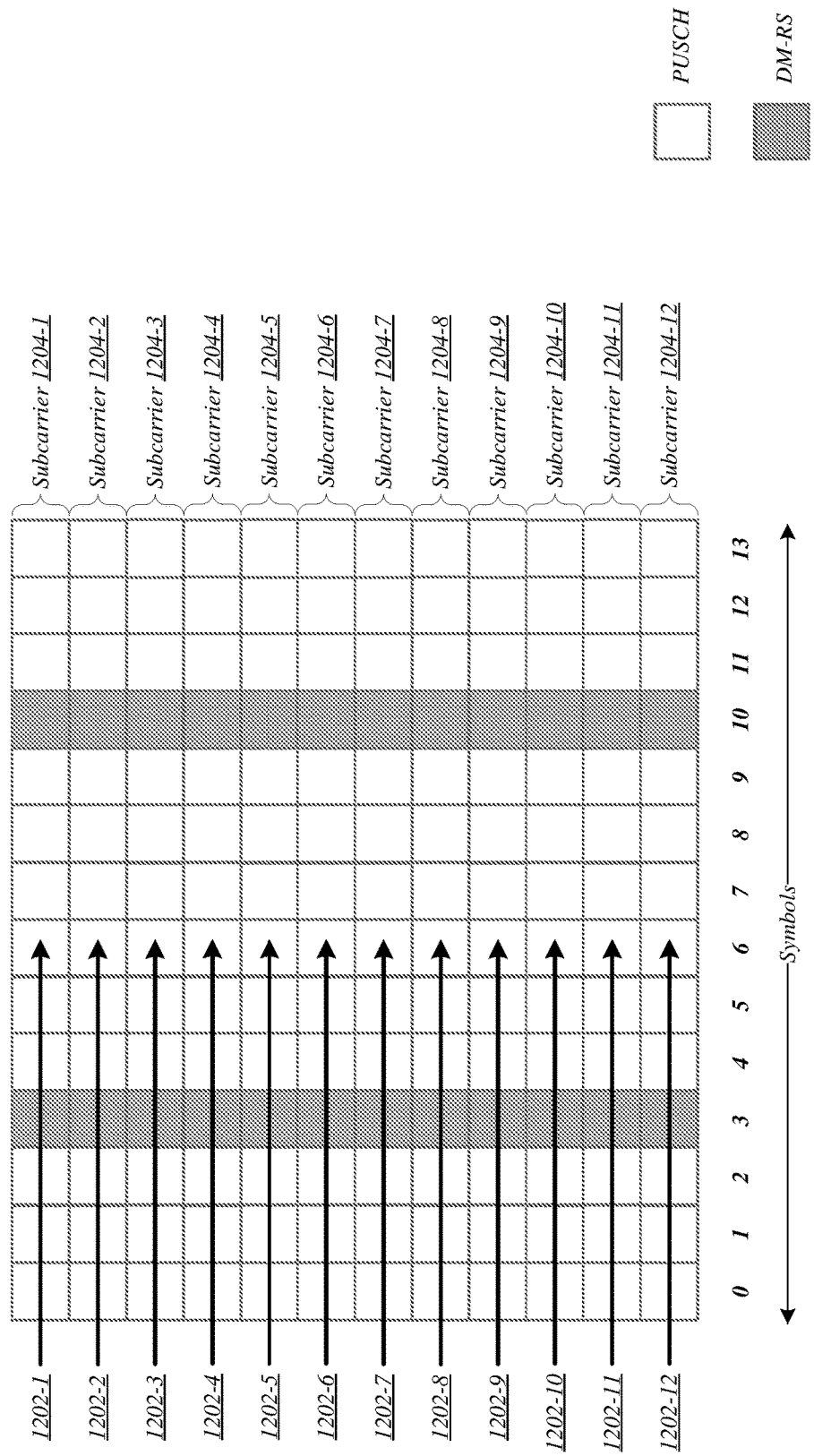
FIG. 12 illustrates an embodiment of a third mapping scheme.

FIG. 12 depicts a second example of a modified RE mapping scheme that may be implemented in some embodiments in order to support earlier decoding of CBs transmitted over the PUSCH. According to modified RE mapping scheme 1200, rate-matched bits are mapped to PUSCH REs of an RB pair in a block-wise time-first manner, according to which the PUSCH REs of the first RB are filled first, in a row-wise fashion, and the PUSCH REs of the second RB are filled second, also in a row-wise fashion. During each of a series of mapping passes, rate-matched bits are mapped, within the OFDM symbols of the RB being filled, to the PUSCH REs of a respective subcarrier. For example, the rate-matched bits associated with the same CB as that discussed above in reference to FIGS. 10 and 11 may be mapped, within OFDM symbols 0 to 6, to the PUSCH REs of subcarriers 1204-1 to 1204-12 during respective passes 1202-1 to 1202-12.

It is worthy of note that according to each of the mapping schemes depicted in FIGS. 10-12, the rate-matched bits of the CB are mapped to half of the PUSCH REs of the RB pair. However, unlike RE mapping scheme 1000, which maps some of the rate-matched bits to respective PUSCH REs of each of OFDM symbols 0 to 13, modified RE mapping schemes 1100 and 1200 map the rate-matched bits only to PUSCH REs comprised in OFDM symbols 0 to 6. In various embodiments, this may enable a receiver to begin decoding the CB following OFDM symbol 6, rather than needing to wait until after OFDM symbol 13. The embodiments are not limited in this context.

In some embodiments, in order to implement frequency-first mapping of CBs to be transmitted over the PUSCH, the interleaving process for those CBs may be skipped. In various embodiments, in order to implement block-wise time-first mapping of CBs to be transmitted over the PUSCH, a matrix-based channel interleaver mapping may be applied by N-times. For instance, in a non-limiting example, assuming N=2 and Z<6144, an input value $C_{mux}$ of the channel interleaver matrix may be given by one of Equations (4), (5), and (6) as follows:

$$C_{mux} = \frac{N_{symb}^{PUSCH}}{N} \quad \text{Equation (4)}$$

$$C_{mux} = \left\lceil \frac{N_{symb}^{PUSCH}}{N} \right\rceil \quad \text{Equation (5)}$$

$$C_{mux} = \left\lfloor \frac{N_{symb}^{PUSCH}}{N} \right\rfloor \quad \text{Equation (6)}$$

Where $C_{mux}$ represents the number of columns of the matrix and $N_{symb}^{PUSCH}$ represents the number of SC-FDMA symbols carrying the PUSCH in the subframe. In some embodiments, if N=2, then $C_{mux}$ may be equal to $C_{slot}$. In various embodiments, the interleaver matrix may be given by Equation (7) as follows:

$$M = \begin{bmatrix} \underline{y}_0 & \cdots & \underline{y}_{C_m-1} & \underline{y}_{R'muxC_m} & \cdots & \underline{y}_{R'muxC_m+(C_m-1)} & \cdots & \underline{y}_{R'muxC_m(C_b-1)+(C_b-1)} \\ \underline{y}_{C_m} & \ddots & \underline{y}_{2C_m-1} & \vdots & & \vdots & & \vdots \\ \vdots & & & & & & & \\ \underline{y}_{(R'mux-1)C_m} & \cdots & \underline{y}_{R'muxC_m-1} & \underline{y}_{R'muxC_m+(R'mux-1)C_m} & \cdots & \underline{y}_{2R'muxC_m-1} & \cdots & \underline{y}_{R'muxC_mC_b-1} \end{bmatrix} \quad (7)$$

Where $C_m$ represents $C_{mux}$, and $C_b$ represents the number of blocks. The embodiments are not limited to this example.

Figure 13:
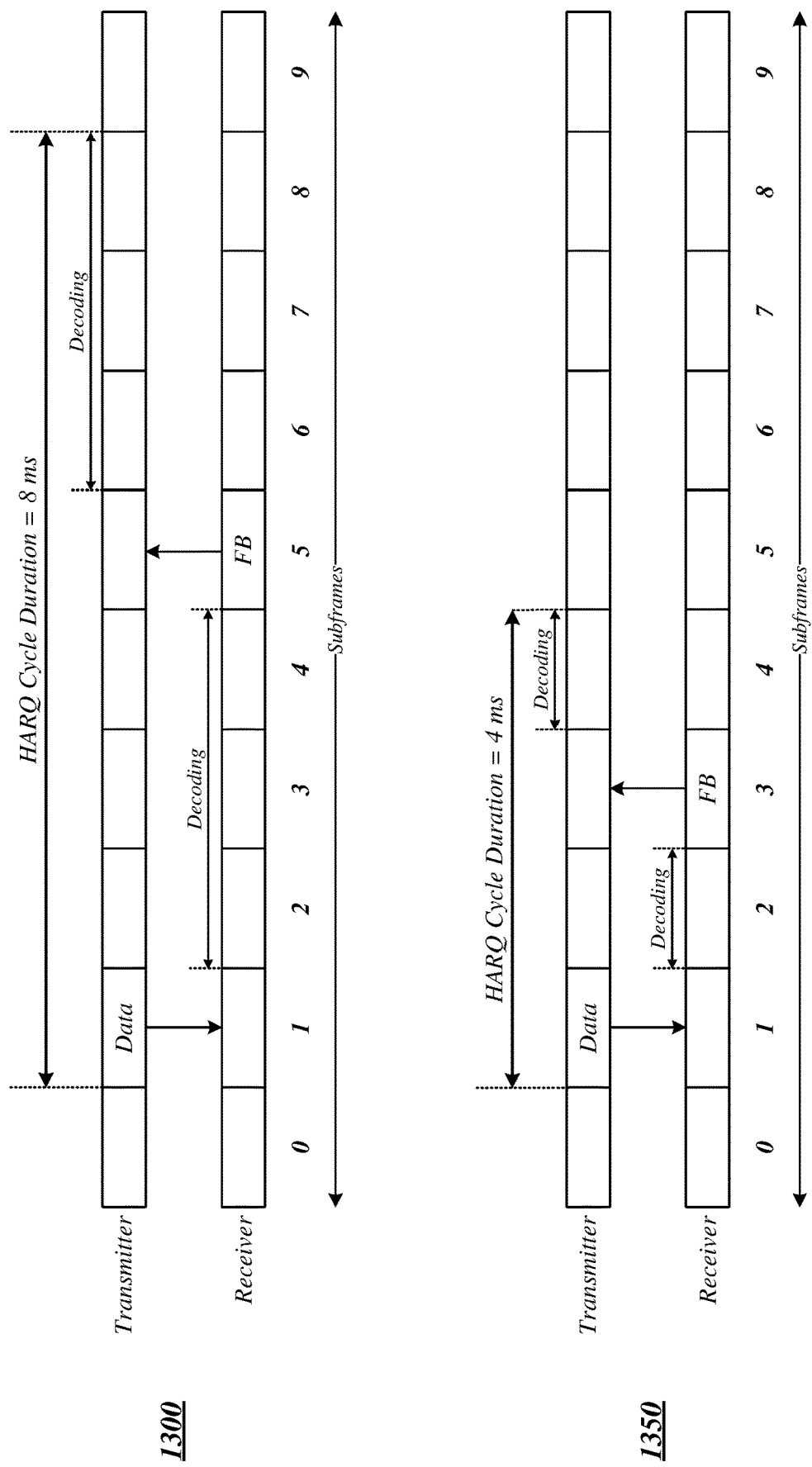
FIG. 13 illustrates an embodiment of a first HARQ cycle and an embodiment of a second HARQ cycle.

FIG. 13 illustrates a HARQ cycle 1300 that may be representative of conventional LTE procedures. With respect to HARQ cycle 1300 and each of the various additional HARQ cycles discussed below, it is assumed that decoding time for a CB is proportional to CB transmission time, and that the amount of time required at the transmitter to process received HARQ feedback for a CB is the same as the amount of time that was required at the receiver to process that CB after receiving it from the transmitter. With respect to HARQ cycle 1300 in particular, it is assumed that the CB decoding time is three times the CB transmission time. It is to be understood, however, that these assumptions are adopted merely for ease of explanation, and that the embodiments are not limited in this context.

In HARQ cycle 1300, a transmitter transmits the data associated with a CB to a receiver. In this example, it takes the transmitter one subframe (subframe 1) to transmit the data associated with the CB to the receiver. The receiver decodes the data during the next three subframes (subframes 2 to 4), and then transmits HARQ feedback (FB) for the data during subframe 5. The transmitter decodes the FB during the next three subframes (subframes 6 to 8). HARQ cycle 1300 thus spans subframes 1 to 8, a duration of 8 ms.

FIG. 13 also illustrates a HARQ cycle 1350. HARQ cycle 1350 may be representative of some embodiments in which it takes one subframe to transmit the data associated with the same CB as that of HARQ cycle 1300, but the CB decoding time is equal to the CB transmission time. In HARQ cycle 1350, as in HARQ cycle 1300, the transmitter transmits the data associated with the CB to the receiver during subframe 1. The receiver decodes the data during subframe 2, and then transmits FB for the data during subframe 3. The transmitter decodes the FB during subframe 4. HARQ cycle 1350 thus spans subframes 1 to 4, a duration of 4 ms.

Figure 14:
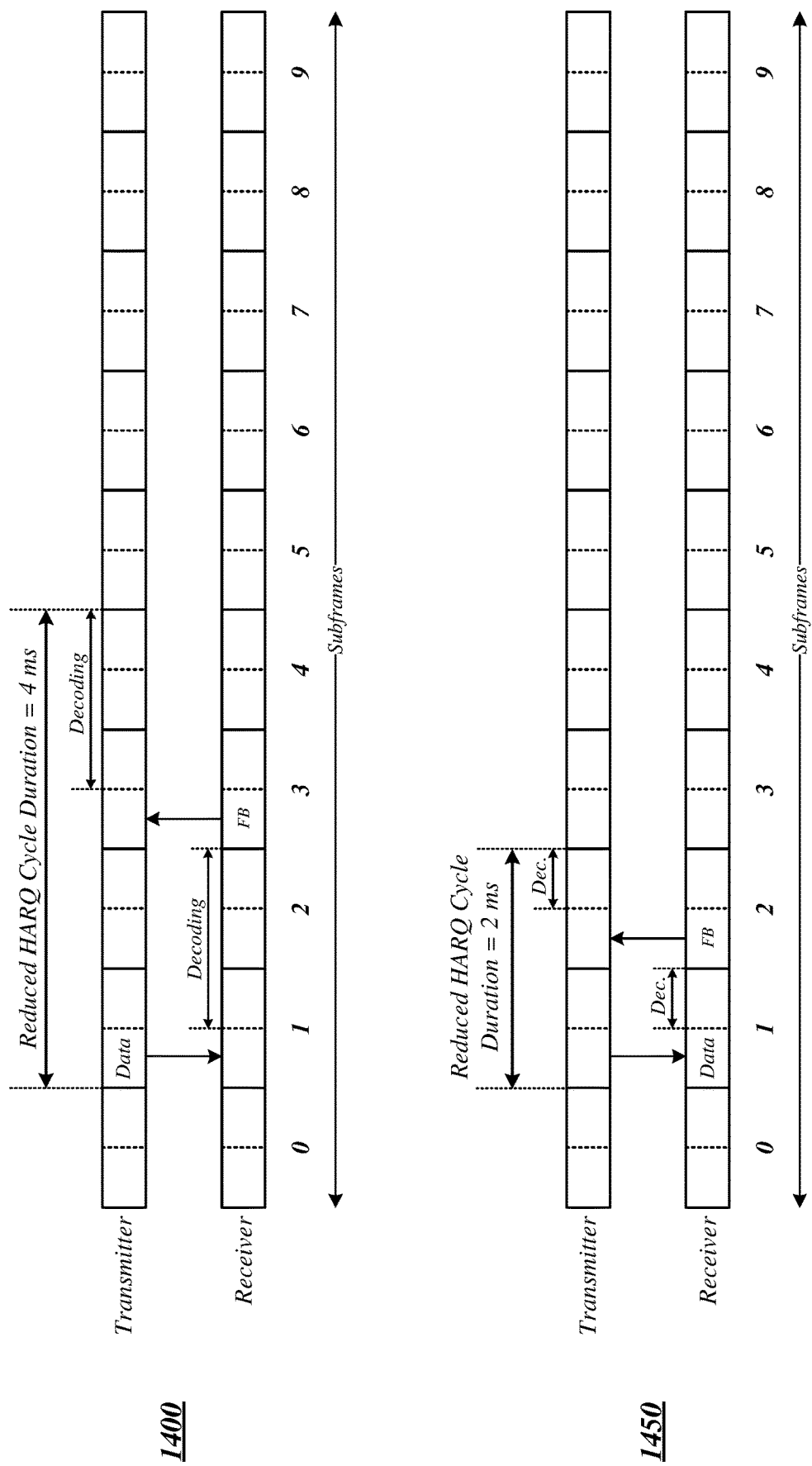
FIG. 14 illustrates an embodiment of a third HARQ cycle and an embodiment of a fourth HARQ cycle.

FIG. 14 illustrates a HARQ cycle 1400 that may be representative of various embodiments in which the CB decoding time is three times the CB transmission time, but the CB transmission time for the same CB as that of HARQ cycles 1300 and 1350 of FIG. 3 is only one slot instead of one subframe. In some embodiments, one or more of the modified CB segmentation techniques and/or modified RE mapping schemes discussed above may be implemented in order to make it possible to transmit the data associated with the CB within one slot. In HARQ cycle 1400, the transmitter transmits the data associated with the CB to the receiver during the first slot of subframe 1. The receiver decodes the data during the next three slots, which comprise the second slot of subframe 1 and both slots of subframe 2. The receiver transmits FB for the data during the first slot of subframe 3. The transmitter decodes the FB during the next three slots, which comprise the second slot of subframe 3 and both slots of subframe 4. HARQ cycle 1400 thus spans subframes 1 to 4, a duration of 4 ms. This constitutes a latency reduction of 4 ms with respect to the 8 ms duration of HARQ cycle 1300 of FIG. 13, according to which the CB transmission time was one subframe instead of one slot.

FIG. 14 also illustrates a HARQ cycle 1450. HARQ cycle 1450 may be representative of various embodiments in which the CB transmission time for the same CB as that of HARQ cycles 1300, 1350, and 1400 is one slot and the CB decoding time is the same as the CB transmission time. In some embodiments, one or more of the modified CB segmentation techniques and/or modified RE mapping schemes discussed above may be implemented in order to make it possible to transmit the data associated with the CB within one slot. In HARQ cycle 1450, as in HARQ cycle 1400, the transmitter transmits the data associated with the CB to the receiver during the first slot of subframe 1. The receiver decodes the data during the second slot of subframe 1, and then transmits FB for the data during the first slot of subframe 2. The transmitter decodes the FB during the second slot of subframe 2. HARQ cycle 1450 thus spans subframes 1 to 2, a duration of 2 ms. This constitutes a latency reduction of 2 ms with respect to the 4 ms duration of HARQ cycle 1350 of FIG. 13, according to which the CB decoding time was equal to the CB transmission time, but the CB transmission time was one subframe instead of one slot. The embodiments are not limited to these examples.

In various embodiments in which latency reductions are achieved via one or more of the modified CB segmentation techniques and/or modified RE mapping schemes discussed above, a modified HARQ cycle timing scheme may be implemented in order to account for the reduced transmission and decoding delays. In some embodiments, a variable duration HARQ cycle may be implemented, according to which the HARQ cycle duration may be configured by upper layer signaling. The embodiments are not limited in this context.

Figure 15:
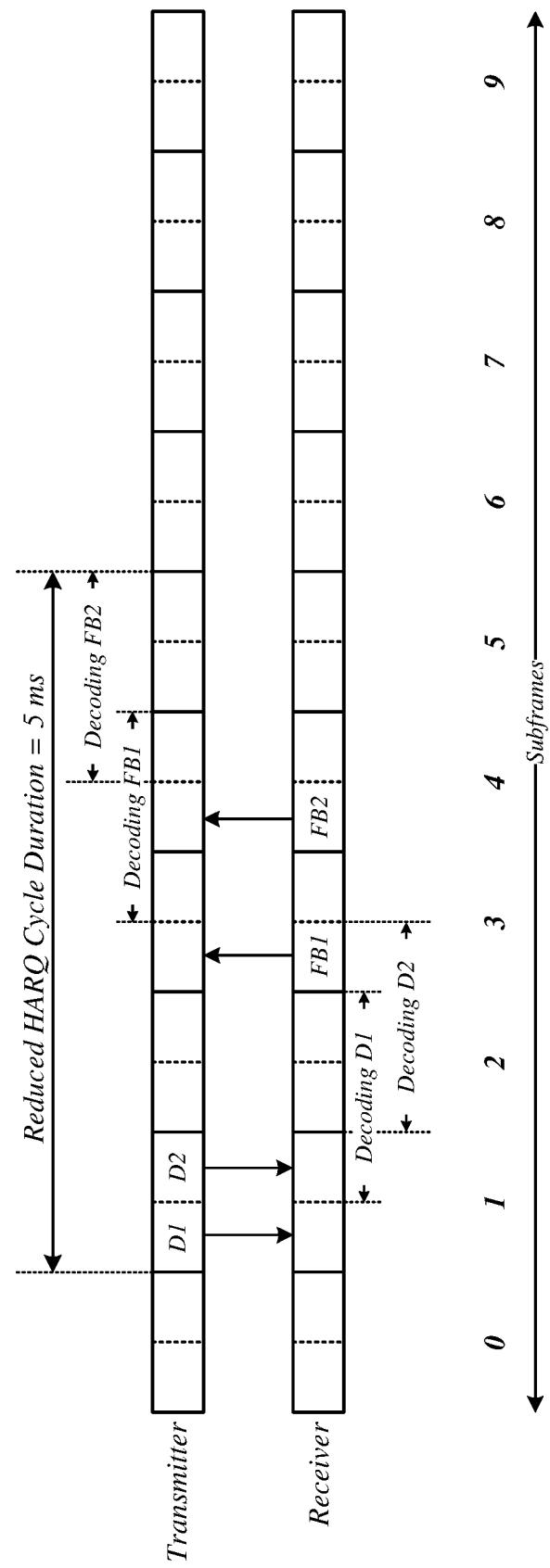
FIG. 15 illustrates an embodiment of a fifth HARQ cycle.

FIG. 15 illustrates a HARQ cycle 1500 that may be representative of various embodiments in which the CB transmission time is one slot, CB decoding time is three times the CB transmission time, and respective feedback for each CB is transmitted separately. In HARQ cycle 1500, the transmitter transmits the data (D1) associated with a first CB during the first slot of subframe 1, and transmits the data (D2) associated with a second CB during the second slot of subframe 1. The receiver decodes D1 during the second slot of subframe 1 and both slots of subframe 2, and sends feedback (FB1) for D1 during the first slot of subframe 3. The receiver decodes D2 during both slots of subframe 2 and the first slot of subframe 3, and then must wait until the first slot of subframe 4 to send feedback (FB2) for D2. The transmitter decodes FB1 during the second slot of subframe 3 and both slots of subframe 4, and decodes FB2 during the 20 second slot of subframe 4 and both slots of subframe 5. HARQ cycle 1500 thus spans subframes 1 to 5, a duration of 5 ms.

Figure 16:
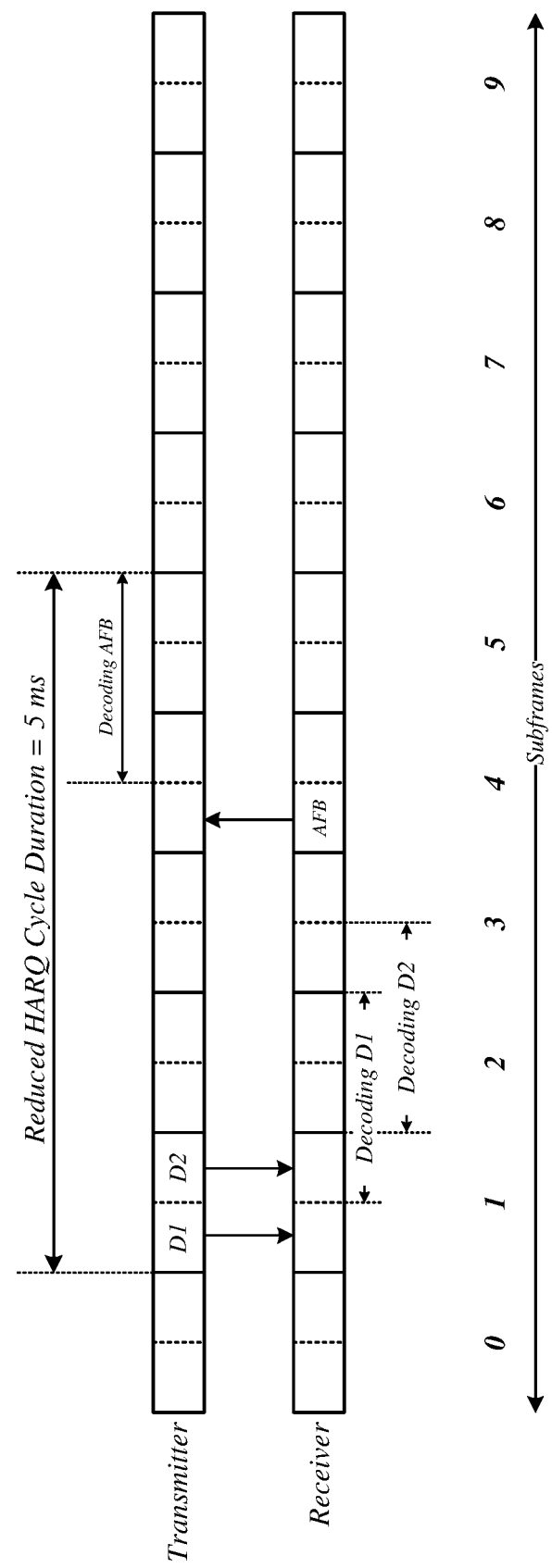
FIG. 16 illustrates an embodiment of a sixth HARQ cycle.

FIG. 16 illustrates a HARQ cycle 1600 that may be representative of some embodiments in which the CB transmission time is one slot, CB decoding time is three times the CB transmission time, and the respective feedback for multiple CBs may be aggregated and transmitted jointly. In HARQ cycle 1600, the transmitter transmits the data (D1) associated with the same first CB as that of HARQ cycle 1500 of FIG. 15 during the first slot of subframe 1, and transmits the data (D2) associated with the same second CB as that of HARQ cycle 1500 during the second slot of subframe 1. The receiver decodes D1 during the second slot of subframe 1 and both slots of subframe 2. However, in contrast to HARQ cycle 1500 of FIG. 15, in HARQ cycle 1600, the receiver refrains from sending feedback for D1 during the first slot of subframe 3. The receiver decodes D2 during both slots of subframe 2 and the first slot of subframe 3. The receiver the transmits aggregated feedback (AFB), comprising respective feedback for both D1 and D2, during the first slot of subframe 4. The transmitter decodes the AFB during the second slot of subframe 4 and both slots of subframe 5. HARQ cycle 1600 thus spans subframes 1 to 5, a duration of 5 ms, which is the same as that of HARQ cycle 1500 of FIG. 15. In comparison to HARQ cycle 1500. HARQ cycle 1600 involves less overhead, since only one HARQ feedback message is transmitted rather than the two that are transmitted in HARQ cycle 1500. On the other hand, according to HARQ cycle 1600, the arrival of feedback for D1 at the transmitter is delayed by one subframe, as this feedback is contained in the AFB transmitted during the first slot of subframe 4, rather than arriving via a separate transmission during the first slot of subframe 3 as it does in HARQ cycle 1500. The embodiments are not limited to these examples.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 17 illustrates an embodiment of a logic flow 1700, which may be representative of the operations executed by one or more embodiments described herein. For example, logic flow 1700 may be representative of operations that may be performed in some embodiments by UE 154 in operating environment 140 of FIG. 1B. As shown in FIG. 17, control information for an rTTI block comprising a plurality of rTTIs may be accessed at 1702, where the plurality of rTTIs includes one or more rTTIs assigned to a UE. For example, UE 154 of FIG. 1B may access control information 156, which may constitute control information for an rTTI block comprising a plurality of rTTIs including one or more rTTIs assigned to UE 154. At 1704, resources of each of the one or more rTTIs assigned to the UE may be identified based on the control information. For example, UE 154 of FIG. 1B may identify resources of the one or more rTTIs based on control information 156. At 1706, wireless communication with an eNB may be performed via resources of at least one of the one or more rTTIs. For example, UE 154 of FIG. 1B may receive data 160 from eNB 152 via identified resources of at least one of the one or more rTTIs. In another example, UE 154 may transmit data 166 to eNB 152 via identified resources of at least one of the one or more rTTIs. The embodiments are not limited to these examples.

Figure 18:
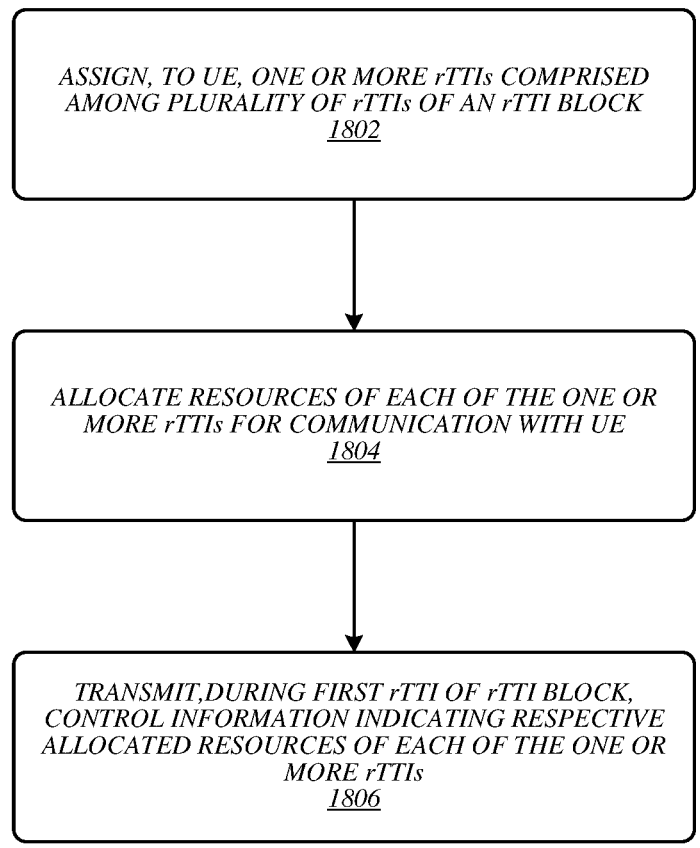
FIG. 18 illustrates an embodiment of a second logic flow.

FIG. 18 illustrates an embodiment of a logic flow 1800, which may be representative of the operations executed by one or more embodiments described herein. For example, logic flow 1800 may be representative of operations that may be performed in some embodiments by eNB 152 in operating environment 140 of FIG. 1B. As shown in FIG. 18, one or more rTTIs may be assigned to a UE at 1802, where the one or more rTTIs are comprised among a plurality of rTTIs of an rTTI block. For example, eNB 152 of FIG. 1B may assign one or more rTTIs of an rTTI block to UE 154. At 1804, resources of each of the one or more rTTIs may be allocated for communication with the UE. For example, eNB 152 of FIG. 1B may allocate resources of each of the one or more rTTIs for communication with UE 154. At 1806, during a first rTTI of the rTTI block, control information may be transmitted that indicates the respective allocated resources of each of the one or more rTTIs. For example, during a first rTTI of an rTTI block comprising one or more rTTIs that it has assigned to UE 154, eNB 152 may transmit control information 156, which may indicate respective allocated resources of each of those one or more rTTIs. The embodiments are not limited to these examples.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as—but not limited to—read only memory (ROM), random access memory (RAM), magnetic disk storage media, optical storage media, semiconductor storage media, flash memory, etc.

Figure 19A:
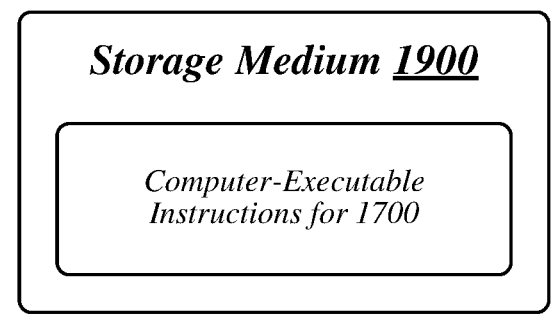
FIG. 19A illustrates an embodiment of a first storage medium.

FIG. 19A illustrates an embodiment of a storage medium 1900. Storage medium 1900 may comprise any non-transitory computer-readable storage medium or machine-readable storage medium, such as an optical, magnetic or semiconductor storage medium. In various embodiments, storage medium 1900 may comprise an article of manufacture. In some embodiments, storage medium 1900 may store computer-executable instructions, such as computer-executable instructions to implement logic flow 1700 of FIG. 17. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 19B:
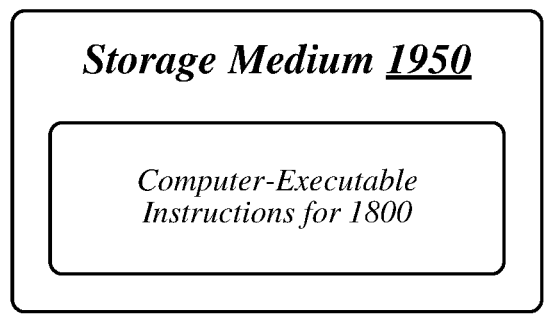
FIG. 19B illustrates an embodiment of a second storage medium.

FIG. 19B illustrates an embodiment of a storage medium 1950. Storage medium 1950 may comprise any non-transitory computer-readable storage medium or machine-readable storage medium, such as an optical, magnetic or semiconductor storage medium. In various embodiments, storage medium 1950 may comprise an article of manufacture. In some embodiments, storage medium 1950 may store computer-executable instructions, such as computer-executable instructions to implement logic flow 1800 of FIG. 18.

Examples of a computer-readable storage medium or machine-readable storage medium and of computer-executable instructions may include any of the respective examples mentioned above in reference to storage medium 1900 of FIG. 19A. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

FIG. 20 illustrates an example of a UE device 2000 that may be representative of a UE that implements one or more of the disclosed techniques in various embodiments. For example, UE device 2000 may be representative of UE 154 of FIG. 1B according to various embodiments. In some embodiments, the UE device 2000 may include application circuitry 2002, baseband circuitry 2004, Radio Frequency (RF) circuitry 2006, front-end module (FEM) circuitry 2008 and one or more antennas 2010, coupled together at least as shown.

The application circuitry 2002 may include one or more application processors. For example, the application circuitry 2002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 2004 may include circuitry such as, but not limited to, one or more single-core or multi-core processors. The baseband circuitry 2004 may include one or more baseband processors and/or control logic to process baseband signals received from a receive signal path of the RF circuitry 2006 and to generate baseband signals for a transmit signal path of the RF circuitry 2006. Baseband processing circuitry 2004 may interface with the application circuitry 2002 for generation and processing of the baseband signals and for controlling operations of the RF circuitry 2006. For example, in some embodiments, the baseband circuitry 2004 may include a second generation (2G) baseband processor 2004a, third generation (3G) baseband processor 2004b, fourth generation (4G) baseband processor 2004c, and/or other baseband processor(s) 2004d for other existing generations, generations in development or to be developed in the future (e.g., fifth generation (5G). 6G, etc.). The baseband circuitry 2004 (e.g., one or more of baseband processors 2004a-d) may handle various radio control functions that enable communication with one or more radio networks via the RF circuitry 2006. The radio control functions may include, but are not limited to, signal modulation/demodulation, encoding/decoding, radio frequency shifting, etc. In some embodiments, modulation/demodulation circuitry of the baseband circuitry 2004 may include Fast-Fourier Jo Transform (FFT), precoding, and/or constellation mapping/demapping functionality. In some embodiments, encoding/decoding circuitry of the baseband circuitry 2004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 2004e of the baseband circuitry 2004 may be configured to run elements of the protocol stack for signaling of the PHY, MAC. RLC, PDCP and/or RRC layers. In some embodiments, the baseband circuitry may include one or more audio digital signal processor(s) (DSP) 2004f. The audio DSP(s) 2004f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2004 and the application circuitry 2002 may be implemented together such as, for example, on a system on a chip (SOC).

In some embodiments, the baseband circuitry 2004 may provide for communication compatible with one or more radio technologies. For example, in some embodiments, the baseband circuitry 2004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 2004 is configured to support radio communications of more than one wireless protocol may be referred to as multi-mode baseband circuitry.

RF circuitry 2006 may enable communication with wireless networks using modulated electromagnetic radiation through a non-solid medium. In various embodiments, the RF circuitry 2006 may include switches, filters, amplifiers, etc. to facilitate the communication with the wireless network. RF circuitry 2006 may include a receive signal path which may include circuitry to down-convert RF signals received from the FEM circuitry 2008 and provide baseband signals to the baseband circuitry 2004. RF circuitry 2006 may also include a transmit signal path which may include circuitry to up-convert baseband signals Jo provided by the baseband circuitry 2004 and provide RF output signals to the FEM circuitry 2008 for transmission.

In some embodiments, the RF circuitry 2006 may include a receive signal path and a transmit signal path. The receive signal path of the RF circuitry 2006 may include mixer circuitry 2006a, amplifier circuitry 2006b and filter circuitry 2006c. The transmit signal path of the RF circuitry 2006 may include filter circuitry 2006c and mixer circuitry 2006a. RF circuitry 2006 may also include synthesizer circuitry 2006d for synthesizing a frequency for use by the mixer circuitry 2006a of the receive signal path and the transmit signal path. In some embodiments, the mixer circuitry 2006a of the receive signal path may be configured to down-convert RF signals received from the FEM circuitry 2008 based on the synthesized frequency provided by synthesizer circuitry 2006d. The amplifier circuitry 2006b may be configured to amplify the down-converted signals and the filter circuitry 2006c may be a low-pass filter (LPF) or band-pass filter (BPF) configured to remove unwanted signals from the down-converted signals to generate output baseband signals. Output baseband signals may be provided to the baseband circuitry 2004 for further processing. In some embodiments, the output baseband signals may be zero-frequency baseband signals, although this is not a requirement. In some embodiments, mixer circuitry 2006a of the receive signal path may comprise passive mixers, although the scope of the embodiments is not limited in this respect.

In some embodiments, the mixer circuitry 2006a of the transmit signal path may be configured to up-convert input baseband signals based on the synthesized frequency provided by the synthesizer circuitry 2006d to generate RF output signals for the FEM circuitry 2008. The baseband signals may be provided by the baseband circuitry 2004 and may be filtered by filter circuitry 2006c. The filter circuitry 2006c may include a low-pass filter (LPF), although the scope of the embodiments is not limited in this respect.

In some embodiments, the mixer circuitry 2006a of the receive signal path and the mixer circuitry 2006a of the transmit signal path may include two or more mixers and may be arranged for quadrature downconversion and/or upconversion respectively. In some embodiments, the mixer circuitry 2006a of the receive signal path and the mixer circuitry 2006a of the transmit signal path may include two or more mixers and may be arranged for image rejection (e.g., Hartley image rejection). In some embodiments, the mixer circuitry 2006a of the receive signal path and the mixer circuitry 2006a may be arranged for direct downconversion and/or direct upconversion, respectively. In some embodiments, the mixer circuitry 2006a of the receive signal path and the mixer circuitry 2006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2006 may include analog-to-digital converter (ADC) and digital-to-analog converter (DAC) circuitry and the baseband circuitry 2004 may include a digital baseband interface to communicate with the RF circuitry 2006.

In some dual-mode embodiments, a separate radio IC circuitry may be provided for processing signals for each spectrum, although the scope of the embodiments is not limited in this respect.

In some embodiments, the synthesizer circuitry 2006d may be a fractional-N synthesizer or a fractional N/N+1 synthesizer, although the scope of the embodiments is not limited in this respect as other types of frequency synthesizers may be suitable. For example, synthesizer circuitry 2006d may be a delta-sigma synthesizer, a frequency multiplier, or a synthesizer comprising a phase-locked loop with a frequency divider.

The synthesizer circuitry 2006d may be configured to synthesize an output frequency for use by the mixer circuitry 2006a of the RF circuitry 2006 based on a frequency input and a divider control input. In some embodiments, the synthesizer circuitry 2006d may be a fractional N/N+1 synthesizer.

In some embodiments, frequency input may be provided by a voltage controlled oscillator (VCO), although that is not a requirement. Divider control input may be provided by either the baseband circuitry 2004 or the applications processor 2002 depending on the desired output frequency. In some embodiments, a divider control input (e.g., N) may be determined from a look-up table based on a channel indicated by the applications processor 2002.

Synthesizer circuitry 2006d of the RF circuitry 2006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2006 may include an IQ/polar converter.

FEM circuitry 2008 may include a receive signal path which may include circuitry configured to operate on RF signals received from one or more antennas 2010, amplify the received signals and provide the amplified versions of the received signals to the RF circuitry 2006 for further processing. FEM circuitry 2008 may also include a transmit signal path which may include circuitry configured to amplify signals for transmission provided by the RF circuitry 2006 for transmission by one or more of the one or more antennas 2010.

In some embodiments, the FEM circuitry 2008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 2006). The transmit signal path of the FEM circuitry 2008 may include a power amplifier (PA) to amplify input RF signals (e.g., provided by RF circuitry 2006), and one or more filters to generate RF signals for subsequent transmission (e.g., by one or more of the one or more antennas 2010.

In some embodiments, the UE device 2000 may include additional elements such as, for example, memory/storage, display, camera, sensor, and/or input/output (I/O) interface.

Figure 21:
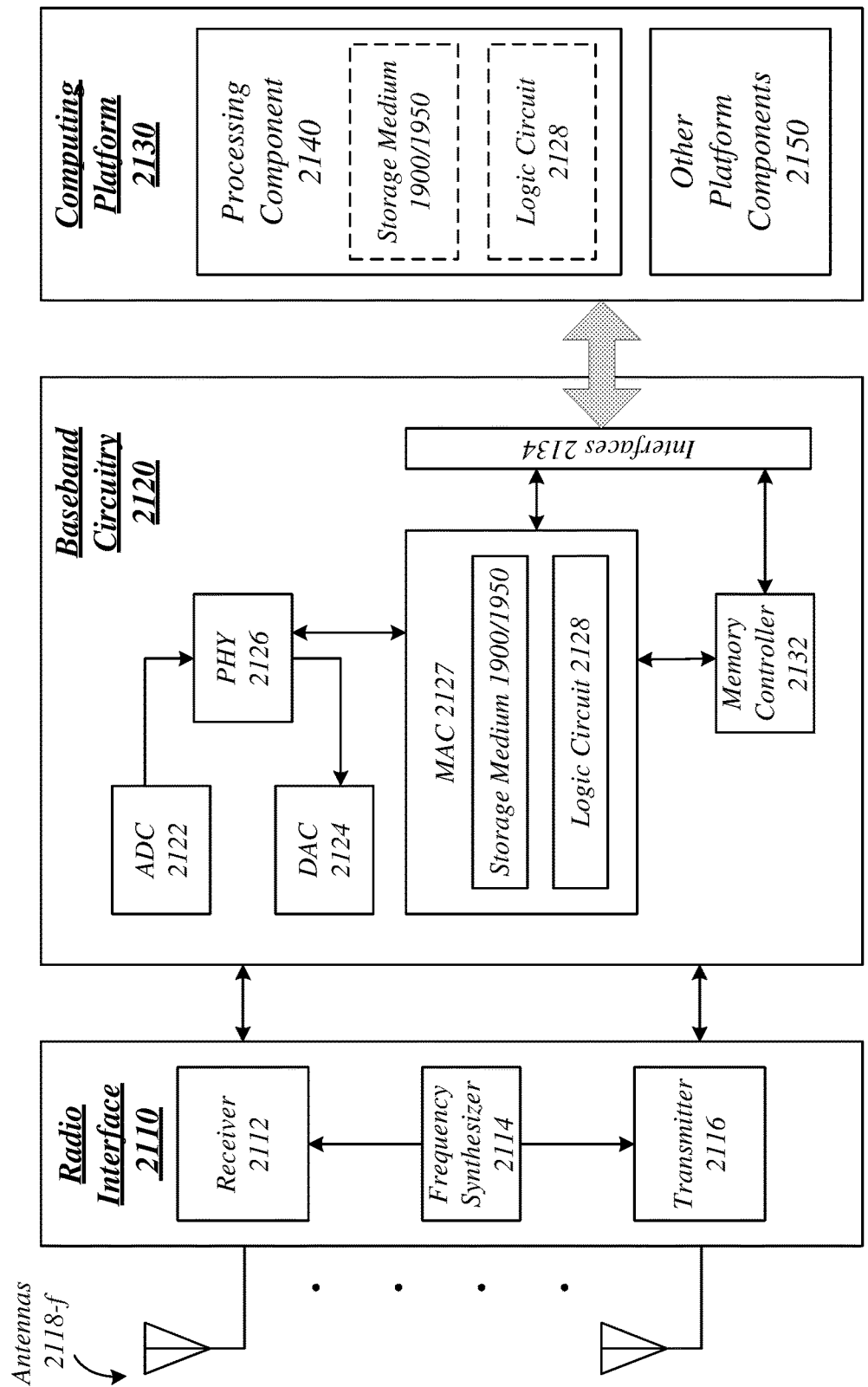
FIG. 21 illustrates an embodiment of a second device.

FIG. 21 illustrates an embodiment of a communications device 2100 that may implement one or more of eNB 152 and UE 154 of FIG. 1B, logic flow 1700 of FIG. 17, logic flow 1800 of FIG. 18, storage medium 1900 of FIG. 19A, storage medium 1950 of FIG. 19B, and UE 2000 of FIG. 20. In various embodiments, device 2100 may comprise a logic circuit 2128. The logic circuit 2128 may include physical circuits to perform operations described for one or more of eNB 152 and UE 154 of FIG. 1B, logic flow 1700 of FIG.

17, logic flow 1800 of FIG. 18, and UE 2000 of FIG. 20 for example. As shown in FIG. 21, device 2100 may include a radio interface 2110, baseband circuitry 2120, and computing platform 2130, although the embodiments are not limited to this configuration.

The device 2100 may implement some or all of the structure and/or operations for one or more of eNB 152 and UE 154 of FIG. 1B, logic flow 1700 of FIG. 17, logic flow 1800 of FIG. 18, storage medium 1900 of FIG. 19A, storage medium 1950 of FIG. 19B, UE 2000 of FIG. 20, and logic circuit 2128 in a single computing entity, such as entirely within a single device. Alternatively, the device 2100 may distribute portions of the structure and/or operations for one or more of eNB 152 and UE 154 of FIG. 1B, logic flow 1700 of FIG. 17, logic flow 1800 of FIG. 18, storage medium 1900 of FIG. 19A, storage medium 1950 of FIG. 19B, UE 2000 of FIG. 20, and logic circuit 2128 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 2110 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 2110 may include, for example, a receiver 2112, a frequency synthesizer 2114, and/or a transmitter 2116. Radio interface 2110 may include bias controls, a crystal oscillator and/or one or more antennas 2118-*f* In another embodiment, radio interface 2110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 2120 may communicate with radio interface 2110 to process receive and/or transmit signals and may include, for example, a mixer for down-converting received RF signals, an analog-to-digital converter 2122 for converting analog signals to digital form, a digital-to-analog converter 2124 for converting digital signals to analog form, and a mixer for up-converting signals for transmission. Further, baseband circuitry 2120 may include a baseband or physical layer (PHY) processing circuit 2126 for PHY link layer processing of respective receive/transmit signals. Baseband circuitry 2120 may include, for example, a medium access control (MAC) processing circuit 2127 for MAC/data link layer processing. Baseband circuitry 2120 may include a memory controller 2132 for communicating with MAC processing circuit 2127 and/or a computing platform 2130, for example, via one or more interfaces 2134.

In some embodiments, PHY processing circuit 2126 may include a frame construction and/or detection module, in combination with additional circuitry such as a buffer memory, to construct and/or deconstruct communication frames. Alternatively or in addition, MAC processing circuit 2127 may share processing for certain of these functions or perform these processes independent of PHY processing circuit 2126. In some embodiments, MAC and PHY processing may be integrated into a single circuit.

The computing platform 2130 may provide computing functionality for the device 2100. As shown, the computing platform 2130 may include a processing component 2140. In addition to, or alternatively of, the baseband circuitry 2120, the device 2100 may execute processing operations or logic for one or more of eNB 152 and UE 154 of FIG. 1B, logic flow 1700 of FIG. 17, logic flow 1800 of FIG. 18, storage medium 1900 of FIG. 19A, storage medium 1950 of FIG. 19B, UE 2000 of FIG. 20, and logic circuit 2128 using the processing component 2140. The processing component 2140 (and/or PHY 2126 and/or MAC 2127) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 2130 may further include other platform components 2150. Other platform components 2150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 2100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 2100 described herein, may be included or omitted in various embodiments of device 2100, as suitably desired.

Embodiments of device 2100 may be implemented using single input single output (SISO) architectures. However, certain implementations may include multiple antennas (e.g., antennas 2118-*f*) for transmission and/or reception using adaptive antenna techniques for beamforming or spatial division multiple access (SDMA) and/or using MIMO communication techniques.

The components and features of device 2100 may be implemented using any combination of discrete circuitry, application specific integrated circuits (ASICs), logic gates and/or single chip architectures. Further, the features of device 2100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 2100 shown in the block diagram of FIG. 21 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 22 illustrates an embodiment of a broadband wireless access system 2200. As shown in FIG. 22, broadband wireless access system 2200 may be an internet protocol (IP) type network comprising an internet 2210 type network or the like that is capable of supporting mobile wireless access and/or fixed wireless access to internet 2210. In one or more embodiments, broadband wireless access system 2200 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 2200, radio access networks (RANs) 2212 and 2218 are capable of coupling with evolved node Bs (eNBs) 2214 and 2220, respectively, to provide wireless communication between one or more fixed devices 2216 and internet 2210 and/or between or one or more mobile devices 2222 and Internet 2210. One example of a fixed device 2216 and a mobile device 2222 is device 2100 of FIG. 21, with the fixed device 2216 comprising a stationary version of device 2100 and the mobile device 2222 comprising a mobile version of device 2100. RANs 2212 and 2218 may implement profiles that are capable of defining the mapping of network functions to one or more physical entities on broadband wireless access system 2200. eNBs 2214 and 2220 may comprise radio equipment to provide RF communication with fixed device 2216 and/or mobile device 2222, such as described with reference to device 2100, and may comprise, for example, the PHY and MAC layer equipment in compliance with a 3GPP LTE Specification or an IEEE 802.16 Standard. eNBs 2214 and 2220 may further comprise an IP backplane to couple to Internet 2210 via RANs 2212 and 2218, respectively, although the scope of the claimed subject matter is not limited in these respects.

Broadband wireless access system 2200 may further comprise a visited core network (CN) 2224 and/or a home CN 2226, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 2224 and/or home CN 2226, and the scope of the claimed subject matter is not limited in these respects. Visited CN 2224 may be referred to as a visited CN in the case where visited CN 2224 is not part of the regular service provider of fixed device 2216 or mobile device 2222, for example where fixed device 2216 or mobile device 2222 is roaming away from its respective home CN 2226, or where broadband wireless access system 2200 is part of the regular service provider of fixed device 2216 or mobile device 2222 but where broadband wireless access system 2200 may be in another location or state that is not the main or home location of fixed device 2216 or mobile device 2222. The embodiments are not limited in this context.

Fixed device 2216 may be located anywhere within range of one or both of eNBs 2214 and 2220, such as in or near a home or business to provide home or business customer broadband access to Internet 2210 via eNBs 2214 and 2220 and RANs 2212 and 2218, respectively, and home CN 2226. It is worthy of note that although fixed device 2216 is generally disposed in a stationary location, it may be moved to different locations as needed. Mobile device 2222 may be utilized at one or more locations if mobile device 2222 is within range of one or both of eNBs 2214 and 2220, for example. In accordance with one or more embodiments, operation support system (OSS) 2228 may be part of broadband wireless access system 2200 to provide management functions for broadband wireless access system 2200 and to provide interfaces between functional entities of broadband wireless access system 2200. Broadband wireless access system 2200 of FIG. 22 is merely one type of wireless network showing a certain number of the components of broadband wireless access system 2200, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a wireless communication method, comprising accessing, at user equipment (UE), control information for a reduced transmission time interval (rTTI) block comprising a plurality of rTTIs including one or more rTTIs assigned to the UE, identifying resources of each of the one or more rTTIs based on the control information, and wirelessly communicating with an evolved node B (eNB) via resources of at least one of the one or more rTTIs.

Example 2 is the wireless communication method of Example 1, each of the plurality of rTTIs assigned to the UE.

Example 3 is the wireless communication method of Example 1, the plurality of rTTIs including a least one rTTI assigned to a second UE.

Example 4 is the wireless communication method of Example 3, comprising identifying an rTTI block sharing format for the rTTI block, and identifying the one or more rTTIs assigned to the UE based on the rTTI block sharing format.

Example 5 is the wireless communication method of Example 4, comprising identifying the rTTI block sharing format based on information received via upper layer signaling.

Example 6 is the wireless communication method of any of Examples 4 to 5, comprising identifying locations of one or more demodulation reference signal (DM-RS) resources of the rTTI block based on the rTTI block sharing format.

Example 7 is the wireless communication method of any of Examples 1 to 4, locations of demodulation reference signal (DM-RS) resources of the rTTI block matching DM-RS resource locations defined for wireless communications performed according to a 1 subframe TTI.

Example 8 is the wireless communication method of any of Examples 1 to 7, comprising identifying, from among multiple defined rTTI block sizes, an rTTI block size associated with the rTTI block, and identifying the plurality of rTTIs based on the rTTI block size.

Example 9 is the wireless communication method of any of Examples 1 to 8, the rTTI block comprising a duration of 1 ms.

Example 10 is the wireless communication method of any of Examples 1 to 9, each of the plurality of rTTIs comprising a duration of 500 µs.

Example 11 is the wireless communication method of any of Examples 1 to 9, each of the plurality of rTTIs comprising a duration of one orthogonal frequency division multiplexing (OFDM) symbol.

Example 12 is the wireless communication method of any of Examples 1 to 11, the control information comprised in signals received via resources of a first rTTI of the rTTI block.

Example 13 is the wireless communication method of any of Examples 1 to 12, comprising operating in an rTTI block mode in response to a block mode parameter value comprised in a received configuration message, and accessing the control information while operating in the rTTI block mode.

Example 14 is the wireless communication method of any of Examples 1 to 13, the control information comprising rTTI block-wise scheduling information.

Example 15 is the wireless communication method of Example 14, the rTTI block-wise scheduling information comprising a format matching a physical DL control channel (PDCCH) DL control information (DCI) format.

Example 16 is the wireless communication method of any of Examples 14 to 15, the rTTI block-wise scheduling information comprising downlink (DL) scheduling information.

Example 17 is the wireless communication method of Example 16, comprising receiving data from the eNB over a physical DL shared channel (PDSCH) via resources of the one or more rTTIs assigned to the UE.

Example 18 is the wireless communication method of any of Examples 16 to 17, comprising identifying each of multiple rTTIs of the rTTI block that are assigned to the UE, and receiving data from the eNB via respective resources of each of the multiple rTTIs assigned to the UE.

Example 19 is the wireless communication method of Example 18, comprising sending a block-wise hybrid automatic repeat request (HARQ) feedback message to provide HARQ feedback for the data received during the multiple rTTIs.

Example 20 is the wireless communication method of Example 19, the block-wise HARQ feedback message to contain individual HARQ feedback for the respective data received during each of the multiple rTTIs.

Example 21 is the wireless communication method of Example 19, the block-wise HARQ feedback message to contain a single collective acknowledgment (ACK) or negative acknowledgment (NACK) of all of the data received during the multiple rTTIs.

Example 22 is the wireless communication method of Example 18, comprising sending a separate HARQ feedback message to provide HARQ feedback for the respective data received during each of the multiple rTTIs.

Example 23 is the wireless communication method of Example 14, the rTTI block-wise scheduling information comprising uplink (UL) scheduling information.

Example 24 is the wireless communication method of Example 23, comprising transmitting data to the eNB over a physical UL shared channel (PUSCH) via resources of at least one of the one or more rTTIs assigned to the UE.

Example 25 is the wireless communication method of any of Examples 23 to 24, comprising identifying multiple rTTIs of the rTTI block that are assigned to the UE, and transmitting data to the eNB via respective resources of each of the multiple rTTIs.

Example 26 is the wireless communication method of Example 25, comprising receiving a block-wise hybrid automatic repeat request (HARQ) feedback message comprising HARQ feedback for the data sent during the multiple rTTIs.

Example 27 is the wireless communication method of Example 26, the block-wise HARQ feedback message to contain individual HARQ feedback for the respective data transmitted during each of the multiple rTTIs.

Example 28 is the wireless communication method of Example 26, the block-wise HARQ feedback to contain a single collective acknowledgment (ACK) or negative acknowledgment (NACK) of all of the data transmitted during the multiple rTTIs.

Example 29 is the wireless communication method of Example 25, comprising receiving, for each of the multiple rTTIs, a separate respective HARQ feedback message comprising HARQ feedback for data transmitted during that rTTI.

Example 30 is an apparatus, comprising at least one memory, and logic, at least a portion of which is implemented in circuitry coupled to the at least one memory, the logic to perform a wireless communication method according to any of Examples 1 to 29.

Example 31 is a system, comprising the apparatus of Example 30, and at least one radio frequency (RF) transceiver.

Example 32 is the system of Example 31, comprising at least one RF antenna.

Example 33 is the system of any of Examples 31 to 32, comprising a touchscreen display.

Example 34 is at least one computer-readable storage medium comprising a set of wireless communication instructions that, in response to being executed on a computing device, cause the computing device to perform a wireless communication method according to any of Examples 1 to 29.

Example 35 is an apparatus, comprising means for performing a wireless communication method according to any of Examples 1 to 29.

Example 36 is a system, comprising the apparatus of Example 35, and at least one radio frequency (RF) transceiver.

Example 37 is the system of Example 36, comprising at least one RF antenna.

Example 38 is the system of any of Examples 36 to 37, comprising a touchscreen display.

Example 39 is a wireless communication method, comprising assigning, by processing circuitry at an evolved node B (eNB), one or more reduced transmit time intervals (rTTIs) to a user equipment (UE), the one or more rTTIs comprised among a plurality of rTTIs of an rTTI block, allocating resources of each of the one or more rTTIs for communication with the UE, and transmitting control information during a first rTTI of the rTTI block, the control information indicating the respective allocated resources of each of the one or more rTTIs.

Example 40 is the wireless communication method of Example 39, comprising designating, among a plurality of frequency sub-bands, one or more rTTI block mode sub-bands, the rTTI block comprising an rTTI block of one of the one or more rTTI block mode sub-bands.

Example 41 is the wireless communication method of any of Examples 39 to 40, comprising designating, among a plurality of subframes, one or more rTTI block mode subframes, the rTTI block comprising an rTTI block of one of the one or more rTTI block mode subframes.

Example 42 is the wireless communication method of any of Examples 39 to 41, comprising sending a configuration message to instruct the UE to operate in an rTTI block mode.

Example 43 is the wireless communication method of any of Examples 39 to 42, comprising assigning each of the plurality of rTTIs to the UE.

Example 44 is the wireless communication method of any of Examples 39 to 42, comprising assigning one or more other rTTIs of the rTTI block to a second UE.

Example 45 is the wireless communication method of Example 44, comprising assigning rTTIs of the rTTI block to the UE and the second UE according to a pattern associated with an rTTI block sharing format.

Example 46 is the wireless communication method of Example 45, comprising selecting the rTTI block sharing format from among multiple predefined rTTI block sharing formats.

Example 47 is the wireless communication method of any of Examples 45 to 46, the pattern comprising alternating, from rTTI to rTTI, between the UE and the second UE.

Example 48 is the wireless communication method of any of Examples 39 to 47, comprising using upper layer signaling to notify the UE of the identities of the one or more rTTIs assigned to the UE.

Example 49 is the wireless communication method of any of Examples 39 to 48, comprising selecting a size for the rTTI block from among multiple permitted rTTI block sizes.

Example 50 is the wireless communication method of any of Examples 39 to 49, the rTTI block comprising a duration of 1 ms.

Example 51 is the wireless communication method of any of Examples 39 to 50, each of the plurality of rTTIs comprising a duration of 500 µs.

Example 52 is the wireless communication method of any of Examples 39 to 50, each of the plurality of rTTIs comprising a duration of one orthogonal frequency division multiplexing (OFDM) symbol.

Example 53 is the wireless communication method of any of Examples 39 to 52, the respective allocated resources of each of the one or more rTTIs comprising resources of a physical downlink shared channel (PDSCH).

Example 54 is the wireless communication method of Example 53, comprising allocating respective PDSCH resources of multiple rTTIs of the rTTI block for communication with the UE, and transmitting data to the UE via the allocated PDSCH resources of the multiple rTTIs.

Example 55 is the wireless communication method of Example 54, comprising receiving a block-wise hybrid automatic repeat request (HARQ) feedback message comprising HARQ feedback for the data transmitted to the UE via the allocated PDSCH resources of the multiple rTTIs.

Example 56 is the wireless communication method of Example 55, the block-wise HARQ feedback message to contain, for each of the multiple rTTIs, respective individual HARQ feedback of data transmitted to the UE via the allocated PDSCH resources of that rTTI.

Example 57 is the wireless communication method of Example 55, the block-wise HARQ feedback message to contain a single collective acknowledgment (ACK) or negative acknowledgment (NACK) of all of the data transmitted to the UE via the allocated PDSCH resources of the multiple rTTIs.

Example 58 is the wireless communication method of Example 54, comprising receiving, for each of the multiple rTTIs, a separate respective HARQ feedback message comprising HARQ feedback for data transmitted to the UE via the allocated PDSCH resources of that rTTI.

Example 59 is the wireless communication method of any of Examples 39 to 52, the respective allocated resources of each of the one or more rTTIs comprising resources of a physical uplink shared channel (PUSCH).

Example 60 is the wireless communication method of Example 59, comprising allocating respective PUSCH resources of multiple rTTIs of the rTTI block for communication with the UE, and receiving data from the UE via the allocated PUSCH resources of the multiple rTTIs.

Example 61 is the wireless communication method of Example 60, comprising transmitting a block-wise hybrid automatic repeat request (HARQ) feedback message comprising HARQ feedback for the data received from the UE via the allocated PUSCH resources of the multiple rTTIs.

Example 62 is the wireless communication method of Example 61, the block-wise HARQ feedback message to contain, for each of the multiple rTTIs, respective individual HARQ feedback of data received from the UE via the allocated PUSCH resources of that rTTI.

Example 63 is the wireless communication method of Example 61, the block-wise HARQ feedback message to contain a single collective acknowledgment (ACK) or negative acknowledgment (NACK) of all of the data received from the UE via the allocated PUSCH resources of the multiple rTTIs.

Example 64 is the wireless communication method of Example 60, comprising transmitting, for each of the multiple rTTIs, a separate respective HARQ feedback message comprising HARQ feedback for data received from the UE via the allocated PUSCH resources of that rTTI.

Example 65 is an apparatus, comprising at least one memory, and logic, at least a portion of which is implemented in circuitry coupled to the at least one memory, the logic to perform a wireless communication method according to any of Examples 39 to 64.

Example 66 is a system, comprising the apparatus of Example 65, and at least one radio frequency (RF) transceiver.

Example 67 is the system of Example 66, comprising at least one RF antenna.

Example 68 is at least one computer-readable storage medium comprising a set of wireless communication instructions that, in response to being executed on a computing device, cause the computing device to perform a wireless communication method according to any of Examples 39 to 64.

Example 69 is an apparatus, comprising means for performing a wireless communication method according to any of Examples 39 to 64.

Example 70 is a system, comprising the apparatus of Example 69, and at least one radio frequency (RF) transceiver.

Example 71 is the system of Example 70, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing." "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein." respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   at least one memory; and
   logic, at least a portion of which is implemented in circuitry coupled to the at least one memory, the logic to:
   access, at user equipment (UE), control information for a reduced transmission time interval (rTTI) block comprising a plurality of rTTIs including multiple rTTIs assigned to the UE, the control information comprised in signals received via resources of an individual rTTI of the multiple rTTIs;
   identify resources of each of the multiple rTTIs collectively based on the control information;
   wirelessly communicate with a base station via the identified resources of at least one of the multiple rTTIs;
   wherein the control information comprises downlink scheduling information identifying allocated physical downlink shared channel (PDSCH) resources of the multiple rTTIs of the rTTI block, the downlink scheduling information comprising a format matching a physical downlink control channel (PDCCH) downlink control information (DCI) format;
   process data received from the base station via the PDSCH resources of the multiple rTTIs of the rTTI block; and
   generate a hybrid automatic repeat request (HARQ) feedback message for transmission over a physical uplink control channel (PUCCH) to provide HARQ feedback for the data.

2. The apparatus of claim 1, the logic to:
   identify an rTTI block sharing format for the rTTI block; and
   identify the multiple rTTIs assigned to the UE based on the rTTI block sharing format.

3. The apparatus of claim 1, the logic to:
   identify, from among multiple defined rTTI block sizes, an rTTI block size associated with the rTTI block; and
   identify the plurality of rTTIs based on the rTTI block size.

4. The apparatus of claim 1,
   wherein the control information is not in the first symbol of a subframe.

5. The apparatus of claim 1, the HARQ feedback message to contain:
   for each of the multiple rTTIs, respective individual HARQ feedback for data received via the allocated PDSCH resources of that rTTI; or
   a single collective acknowledgment (ACK) or negative acknowledgment (NACK) of all of the data received via the allocated PDSCH resources of the multiple rTTIs.

6. A system, comprising:
   the apparatus of claim 1;
   at least one radio frequency (RF) transceiver; and
   at least one RF antenna.

7. An apparatus, comprising:
   at least one memory; and
   logic, at least a portion of which is implemented in circuitry coupled to the at least one memory, the logic to:
   assign multiple reduced transmit time intervals (rTTIs) to user equipment (UE) according to a pattern associated with an rTTI block sharing format, the multiple rTTIs to be comprised among a plurality of rTTIs of an rTTI block;
   assign one or more other rTTIs comprised among the plurality of rTTIs to a second UE according to the pattern associated with the rTTI block sharing format;
   allocate resources of each of the multiple rTTIs for communication with the UE; and
   generate control information for transmission during an individual rTTI of the multiple rTTIs, the control information to indicate the allocated resources of each of the multiple rTTIs collectively.

8. The apparatus of claim 7, the rTTI block comprising a size selected from among multiple permissible rTTI block sizes.

9. The apparatus of claim 7, the rTTI block comprising a duration of one subframe, each of the plurality of rTTIs comprising a duration of one slot.

10. The apparatus of claim 7, the allocated resources comprising resources of a physical downlink shared channel (PDSCH).

11. The apparatus of claim 7, the allocated resources comprising resources of a physical uplink shared channel (PUSCH).

12. The apparatus of claim 7, the logic to:
    generate hybrid automatic repeat request (HARQ) feedback for data received from the UE via the allocated resources; or
    process received HARQ feedback for data transmitted to the UE via the allocated resources.

13. The apparatus of claim 7, wherein the control information is not in the first symbol of a subframe.

14. A method for wireless communication, comprising:
    assigning multiple reduced transmit time intervals (rTTIs) to user equipment (UE) according to a pattern associated with an rTTI block sharing format, the multiple rTTIs to be comprised among a plurality of rTTIs of an rTTI block;

assigning one or more rTTIs comprised among the plurality of rTTIs to a second UE according to the pattern associated with the rTTI block sharing format;

allocating resources of each of the multiple rTTIs for communication with the UE; and generating control information for transmission during an individual rTTI of the multiple rTTIs, the control information to indicate the allocated resources of each of the multiple rTTIs collectively;

wherein the control information comprises downlink scheduling information identifying allocated physical downlink shared channel (PDSCH) resources of the multiple rTTIs of the rTTI block, and the downlink scheduling information comprises a format matching a physical downlink control channel (PDCCH) downlink control information (DCI) format.

15. The method of claim 14, wherein the rTTI block comprises a size selected from among multiple permissible rTTI block sizes.

16. The method of claim 14, wherein each of the plurality of rTTIs comprises a duration of one slot.

17. The method of claim 14, wherein the allocated resources comprise resources of a physical downlink shared channel (PDSCH).

18. The method of claim 14, wherein the allocated resources comprise resources of a physical uplink shared channel (PUSCH).

19. The method of claim 14, further comprising:

generating rTTI hybrid automatic repeat request (HARQ) feedback for data received from the UE via the allocated resources; or processing received rTTI HARQ feedback for data transmitted to the UE via the allocated resources.

20. The apparatus method of claim 14, wherein the control information is not in the first symbol of a subframe.

* * * * *